(12) United States Patent
Urisaka

(10) Patent No.: US 6,445,363 B1
(45) Date of Patent: Sep. 3, 2002

(54) HEAD-MOUNTED DISPLAY APPARATUS

(75) Inventor: Shinya Urisaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,815

(22) Filed: Feb. 8, 2000

(30) Foreign Application Priority Data

Feb. 12, 1999 (JP) .......................................... 11-034951
Feb. 12, 1999 (JP) .......................................... 11-034952
Feb. 18, 1999 (JP) .......................................... 11-039765

(51) Int. Cl.$^7$ ................................................ G09G 5/00
(52) U.S. Cl. ................................ 345/7; 348/51; 434/43
(58) Field of Search ......................... 345/7, 8; 348/51, 348/345, 375; 396/373, 378; 434/43

(56) References Cited

U.S. PATENT DOCUMENTS 5,047,942 A * 9/1991 Middleton et al. .......... 364/427
5,153,569 A * 10/1992 Kawamura et al. ......... 340/705
5,610,678 A * 3/1997 Tsuboi et al. ............... 396/373
5,646,641 A * 7/1997 Okamura et al. .............. 345/8
6,151,060 A * 11/2000 Tabata ......................... 348/51

* cited by examiner

Primary Examiner—Amare Mengistu
(74) Attorney, Agent, or Firm—Robin, Blecker & Daley

(57) ABSTRACT

In a head-mounted display apparatus arranged to support a left-eye display system and a right-eye display system, a mounting-state confirming figure for confirming a mounting state of the head-mounted display apparatus on the user is displayed, and the displaying state of the mounting-state confirming figure on the left-eye display system and the right-eye display system is changed according to the confirmation operation on the mounting-state confirming figure.

25 Claims, 27 Drawing Sheets

FIG. 18
 WARNING
FOUR HOURS WILL ELAPSE SOON.
POWER SUPPLY WILL BE CUT OFF IN FIFTEEN MINUTES.
CONFIRMATION 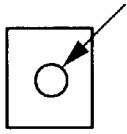
FIG. 19
 WARNING
TAKE A REST BECAUSE FOUR HOURS OR
MORE HAVE ELAPSED.
POWER SUPPLY WILL BE CUT OFF AUTOMATICALLY.
CONFIRMATION 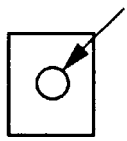

FIG. 23

SET WARNING NOTICE TIME

WARNING 1 : 2 HOURS 00 MINUTES

WARNING 2 : 3 HOURS 20 MINUTES

WARNING 3 : 3 HOURS 30 MINUTES

HEAD-MOUNTED DISPLAY APPARATUS

BACKGROUND OF THE INVENTION

1. Field of the Invention

The present invention relates to a head-mounted display apparatus.

2. Description of Related Art

Heretofore, there is a head-mounted display apparatus as a display apparatus arranged to be mountable on a part of the body, such as the head, of a user and to display an image supplied from outside in such a way as to be observable by the user with the display apparatus in a state of being mounted on the head of the user.

Such a head-mounted display apparatus will be described with reference to FIG. 1. FIG. 1 is a block diagram showing the arrangement of the conventional head-mounted display apparatus.

The head-mounted display apparatus is provided, as shown in FIG. 1, with an O/E detecting circuit 132 for inputting a video signal (NTSC signal) supplied from outside, for example, a TV tuner or a video reproducing apparatus. The O/E detecting circuit 132 is a circuit provided for detecting whether the inputted video signal is a video signal for the left eye (left-eye video signal) or a video signal for the right eye (right-eye video signal). A detection signal indicative of a result of the detection by the O/E detecting circuit 132 is inputted to a control means 130. Further, the video signal inputted to the O/E detecting circuit 132 is supplied to a decoder processing part 102.

The decoder processing part 102 converts the inputted video signal into R, G and B signals, and the R, G and B signals are inputted to a display driver 103. The display driver 103 supplies the inputted R, G and B signals to a left-eye display system 104 or a right-eye display system 118 on the basis of a control signal from the control means 130. Here, the control means 130 discriminates whether the inputted video signal is the left-eye video signal or the right-eye video signal, on the basis of the detection signal from the O/E detecting circuit 132, and, when the inputted video signal is the left-eye video signal, outputs a control signal for instructing the display driver 103 to supply the R, G and B signals to the left-eye display system 104, and, when the inputted video signal is the right-eye video signal, outputs a control signal for instructing the display driver 103 to supply the R, G and B signals to the right-eye display system 118.

The left-eye display system 104 has a liquid crystal display element 113 for receiving the R, G and B signals from the display driver 103 and displaying a video image represented by the R, G and B signals. The liquid crystal display element 113 is illuminated from the back side thereof by a back light 107, which is driven by a driver 105. A video image displayed on the liquid crystal display element 113 is enlarged by an optical element 115 and is then led to the left eye 125 of the user. More specifically, in the optical element 115, light having passed through the liquid crystal display element 113 from the back light 107 enters an entrance surface 109. The entering light is made incident on a reflecting surface 111 at an angle more than a critical angle to be totally reflected at the reflecting surface 111. Then, the light is made incident on a half-mirror 117 to be reflected toward the reflecting surface 111. The light reflected from the half-mirror 117 enters the reflecting surface 111 at an angle less than the critical angle and, then, exits toward the left eye 125 of the user. On the left eye 125, the light from the optical element 115 is focused to form an image.

The right-eye display system 118 has, similarly to the left-eye display system 104, a liquid crystal display element 123, an optical element 128, a back light 121 and a driver 119, and is arranged to enlarge, by the optical element 128, a video image displayed on the liquid crystal display element 123 and, then, lead the video image to the right eye (not shown) of the user.

To the blocks including the display driving circuit 103 and the drivers 105 and 119, the respective applicable driving voltages are supplied from a power supply circuit 101. The power supply circuit 101 receives electric power from an external power supply 101a through a power supply switch 101b and forms the driving voltages to be supplied to the respective blocks.

In the above-mentioned head-mounted display apparatus, it is necessary to correctly mount the apparatus on the head of the user in such a way as to cause right and left video images to naturally merge with each other. For that purpose, the head-mounted display apparatus has such an arrangement that mounting-state confirming figures are supplied to the respective display systems for the right eye and the left eye from an external apparatus so as to enable the user to confirm the mounting state of the head-mounted display apparatus by observing the mounting-state confirming figures displayed on the respective display systems.

However, in the above-mentioned conventional head-mounted display apparatus, since, in the event of confirming the mounting state thereof, the mounting-state confirming figures are displayed simultaneously on the right-eye and left-eye display systems, the user is required to observe the respective figures simultaneously with both the right and left eyes. Therefore, it is very difficult for the user to confirm whether each of the displayed figures for the right and left eyes is clearly seen. As a result, it is impossible to know whether the mounting state of the head-mounted display apparatus is appropriate or not.

BRIEF SUMMARY OF THE INVENTION

It is an object of the invention to provide a head-mounted display apparatus capable of enabling the user to correctly know the mounting state of the head-mounted display apparatus, and a mounting-state conforming method for use in the head-mounted display apparatus.

To attain the above object, in accordance with an aspect of the invention, there is provided a head-mounted display apparatus which comprises left-eye image display means, right-eye image display means, a mounting unit arranged to support the left-eye image display means and the right-eye image display means and to be mountable on a part of the body of a user, figure generating means for generating a mounting-state confirming figure for confirming a mounting state of the mounting unit when the mounting unit has been mounted on the part of the body of the user, operation inputting means for inputting a confirmation operation when the user has confirmed the mounting state of the mounting unit, control means for selecting, in accordance with the inputting of the confirmation operation, one of a state of displaying the mounting-state confirming figure both on the left-eye image display means and the right-eye image display means, a state of displaying the mounting-state confirming figure on one of the left-eye image display means and the right-eye image display means, and a state of displaying the mounting-state confirming figure on another of the left-eye image display means and the right-eye image display means.

It is another object of the invention to provide a head-mounted display apparatus arranged to, surely and at good timing, give warning of long-time usage to a user and having an improved operability.

It is a further object of the invention to provide a head-mounted display apparatus arranged to, timely and surely, give warning of long-time usage, etc., to a user in accordance with the mounting state of the head-mounted display apparatus or the inputting state of a video signal.

It is a still further object of the invention to provide a head-mounted display apparatus capable of enabling a user to surely recognize the mounting state of the head-mounted display apparatus.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 18 is a diagram showing a display example of a second warning word in step S119 of FIG. 15.

FIG. 19 is a diagram showing a display example of a third warning word in step S126 of FIG. 15.

FIG. 23 is a diagram showing a warning notice time changing/setting picture in a head-mounted display apparatus according to an eighth embodiment of the invention.

DETAILED DESCRIPTION OF THE INVENTION

Hereinafter, preferred embodiments of the invention will be described in detail with reference to the drawings.
(First Embodiment)

Figure 2:
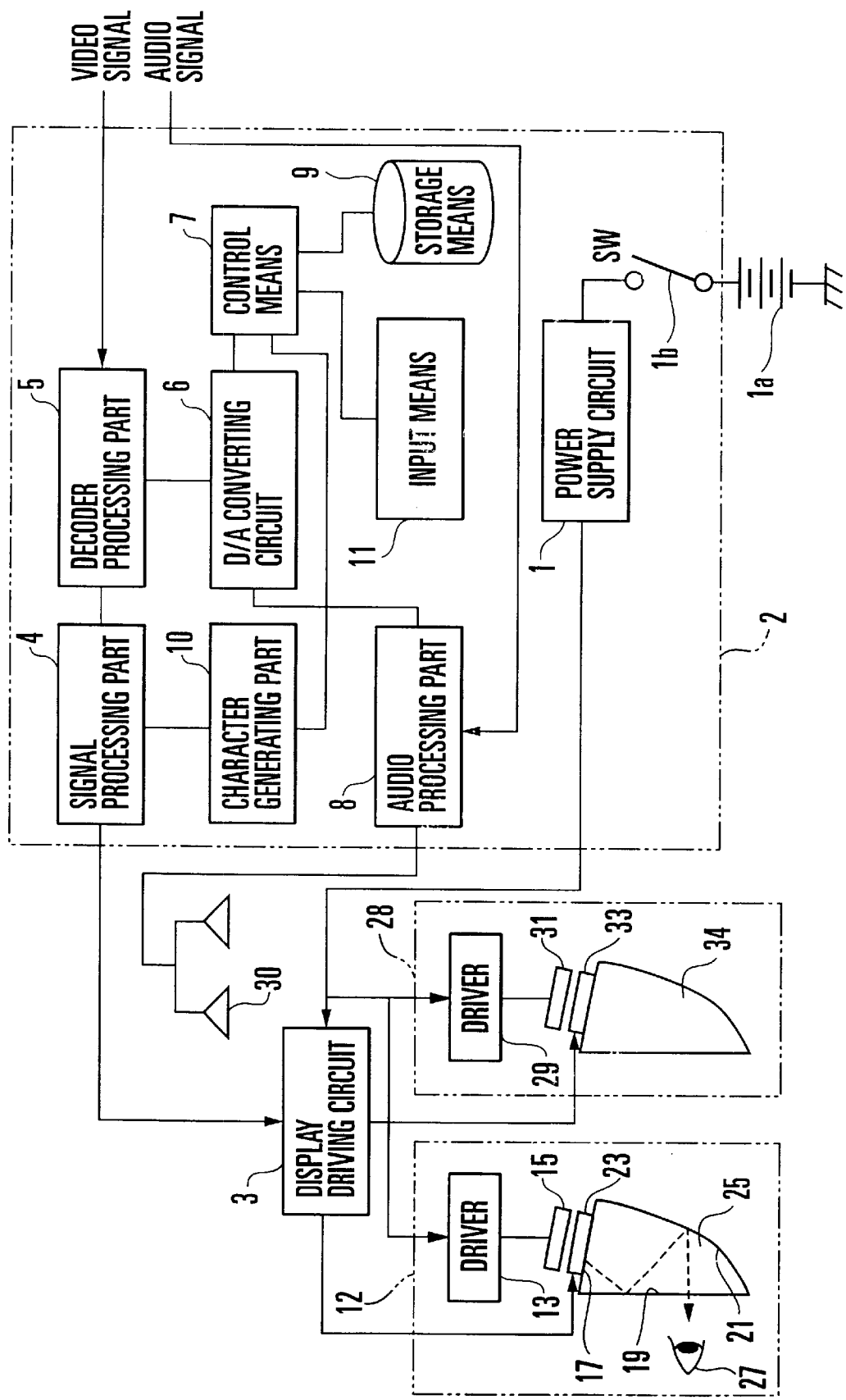
FIG. 2 is a block diagram showing the arrangement of a head-mounted display apparatus according to a first embodiment of the invention.
Figure 3:
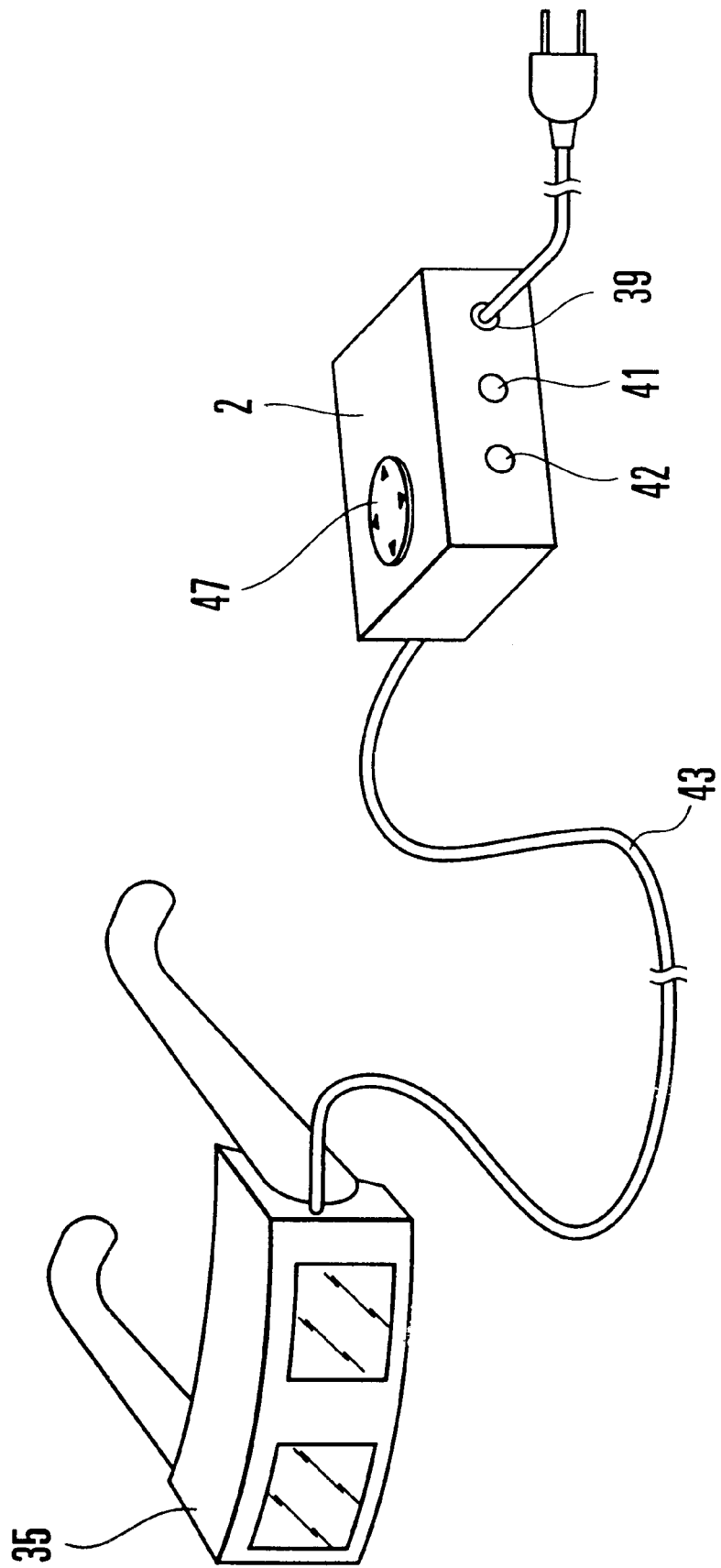
FIG. 3 is a perspective view showing the appearance of the head-mounted display apparatus shown in FIG. 2.

FIG. 2 is a block diagram showing the arrangement of a head-mounted display apparatus according to a first embodiment of the invention, and FIG. 3 is a perspective view showing the appearance of the head-mounted display apparatus shown in FIG. 2.

The head-mounted display apparatus is provided, as shown in FIG. 3, with a relay box 2 and a mounting unit 35 arranged to be mountable on a part of the body, such as the head, of a user. The relay box 2 is provided with a power supply jack 39 for connection with an external power supply, a video input jack 41 for inputting a video signal (NTSC signal) supplied from an external apparatus, for example, a TV tuner or a video reproducing apparatus, an audio input jack 42 for inputting an audio signal from the external apparatus, and an operation button 47. The operation button 47 serves as a power supply switch, an action setting switch, a confirmation operation switch, etc. By operating the operation button 47, the brightness, tint, color density, sound volume, sound tone, sound balance, etc., of a display image plane of the head-mounted display apparatus can be adjusted, and, further, a confirmation input operation for confirming the mounting state of the head-mounted display apparatus can be performed.

The relay box 2 contains, as will be described later, a number of blocks for realizing the various functions, such as a power supply function, a video signal processing function and an audio signal processing function, and supplies a video signal (R, G and B signals), an audio signal, a control signal, electric power, etc., to the mounting unit 35 through a cable 43. The mounting unit 35 is provided, as will be described later, with a left-eye display system and a right-eye display system for displaying a video image represented by the supplied video signal, enlarging the video image, and, then, leading the video image to the left eye and the right eye of the user.

The details of the arrangement of the head-mounted display apparatus will be described. Referring to FIG. 2, the relay box 2 contains a decoder processing part 5 for inputting a video signal supplied from the external apparatus, an audio processing part 8 for inputting an audio signal supplied from the external apparatus, a control means 7 and a power supply circuit 1. The control means 7 performs the setting of actions, etc., on the basis of inputs from an input means 11, and performs a control operation related to the action as set. The input means 11 inputs the operation of the operation button 47 (shown in FIG. 3), and supplies to the control means 7 a signal corresponding to the inputted operation. Further, the control means 7 reads out a plurality of video parameters (brightness, tint, color density, etc.) and a plurality of audio parameters (sound volume, balance, sound tone, etc.) from a storage means 9, and sends these parameters to a D/A converting circuit 6. The D/A converting circuit 6 converts, by D/A conversion, the respective video parameters and the respective audio parameters into analog signals. The analog signals corresponding to the respective video parameters are inputted to the decoder processing part 5, and the analog signals corresponding to the respective audio parameters are inputted to the audio processing part 8.

The decoder processing part 5 converts the inputted video signal into R, G and B signals in accordance with the video parameters represented by the respective analog signals as inputted. Then, the R, G and B signals are inputted to a signal processing part 4. The signal processing part 4 outputs the R, G and B signals supplied from the decoder processing part 5 and an image signal outputted from a character generating part 10 independently from each other, or combines the R, G and B signals with the image signal, according to necessity, and outputs the combined signals. The character generating part 10 forms, in accordance with an instruction from the control means 7, an image signal representing a mounting-state confirming figure, in addition to signals for a precaution and a warning word for the user and for image plane adjusting data related to brightness, color, etc.

Incidentally, while, in the first embodiment, the decoder processing part 5 is disposed in the front stage of the signal processing part 4, the decoder processing part 5 may be disposed in the rear stage of the signal processing part 4. In this case, a video signal from the external apparatus is first inputted to the signal processing part 4, and is then combined with an image signal from the character generating part 10 according to necessity. After that, the combined signal is inputted to the decoder processing part 5 so as to be converted into R, G and B signals.

The audio processing part 8 processes the inputted audio signal in accordance with the audio parameters represented by the respective analog signals as inputted. The thus-processed audio signal is inputted to earphones 30 through the cable 43 (shown in FIG. 3). The earphones 30 are attached to the mounting unit 35 (shown in FIG. 3).

The power supply circuit 1 receives electric power from an external power supply 1a through a power supply switch 1b, and forms and supplies driving voltages for the respective blocks. Further, driving voltages for a display driving circuit 3 and drivers 13 and 29 which are contained in the mounting unit 35 (shown in FIG. 3) are supplied through the cable 43 (shown in FIG. 3).

The R, G and B signals (or the image signal, or the R, G and B signals combined with the image signal) outputted from the signal processing part 4 are inputted to the display driving circuit 3 through the cable 43 (shown in FIG. 3). The display driving circuit 3 supplies the inputted R, G and B signals to a left-eye display system 12 or a right-eye display system 28. The display driving circuit 3, the left-eye display system 12 and the right-eye display system 28 are contained in the mounting unit 35 (shown in FIG. 3).

The left-eye display system 12 has a liquid crystal display element 23 arranged to receive the R, G and B signals from the display driving circuit 3 and to display a video image represented by the R, G and B signals. The liquid crystal display element 23 is illuminated from the back side thereof by a back light 15, which is driven by a driver 13. A video image displayed on the liquid crystal display element 23 is enlarged by an optical element 25 and is then led to the left eye 27 of the user. More specifically, in the optical element 25, light having passed through the liquid crystal display element 23 from the back light 15 enters an entrance surface 17. The entering light is made incident on a reflecting surface 19 at an angle more than a critical angle to be totally reflected at the reflecting surface 19. Then, the light is made incident on a half-mirror 21 to be reflected toward the reflecting surface 19. The light reflected from the half-mirror 21 enters the reflecting surface 19 at an angle less than the critical angle and, then, exits toward the left eye 27 of the user. On the left eye 27, the light from the optical element 25 is focused to form an image.

The right-eye display system 28 has, similarly to the left-eye display system 12, a liquid crystal display element 33, an optical element 34, a back light 31 and a driver 29, and is arranged to enlarge, by the optical element 34, a video image displayed on the liquid crystal display element 33 and, then, lead the video image to the right eye (not shown) of the user.

To the display driving circuit 3 and the drivers 13 and 29, as mentioned above, the driving voltages are respectively supplied from the power supply circuit 1.

Incidentally, while, in the first embodiment, the back lights 15 and 31 are respectively provided in the left-eye display system 12 and the right-eye display system 28, a single back light may be used for both the liquid crystal display elements 23 and 33.

Figure 4:
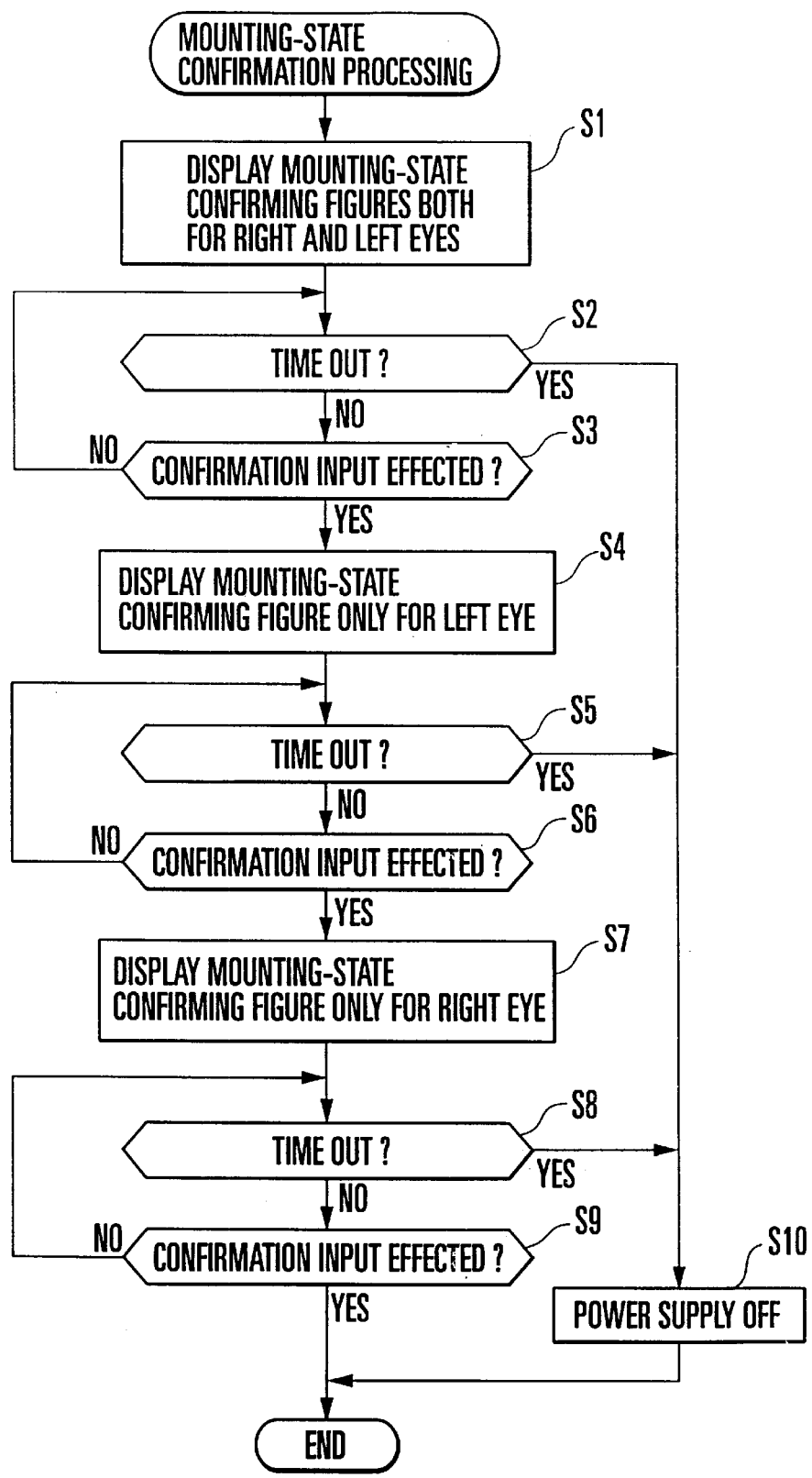
FIG. 4 is a flow chart showing the procedure for the mounting-state confirmation processing in the head-mounted display apparatus shown in FIG. 2.
Figure 5:
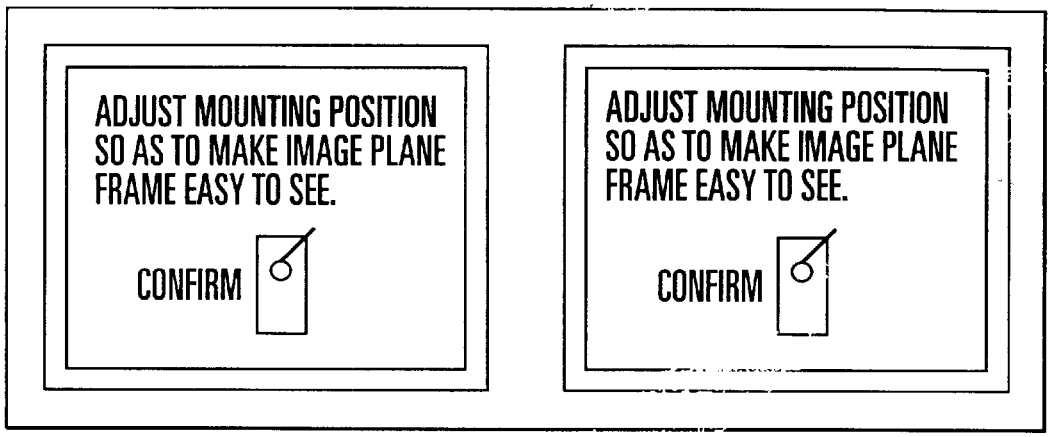
FIG. 5 is a diagram showing a display example of a mounting-state confirming figure in step S1 of FIG. 4.
Figure 6:
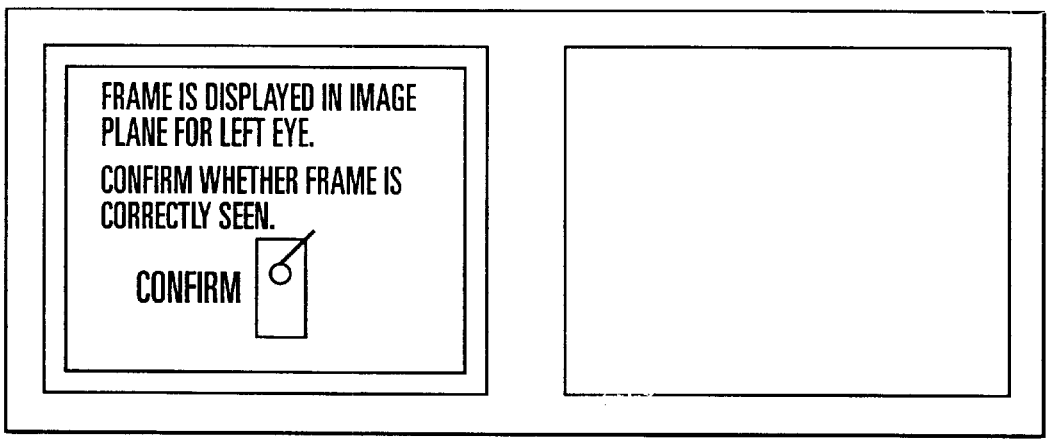
FIG. 6 is a diagram showing a display example of the mounting-state confirming figure in step S4 of FIG. 4.
Figure 7:
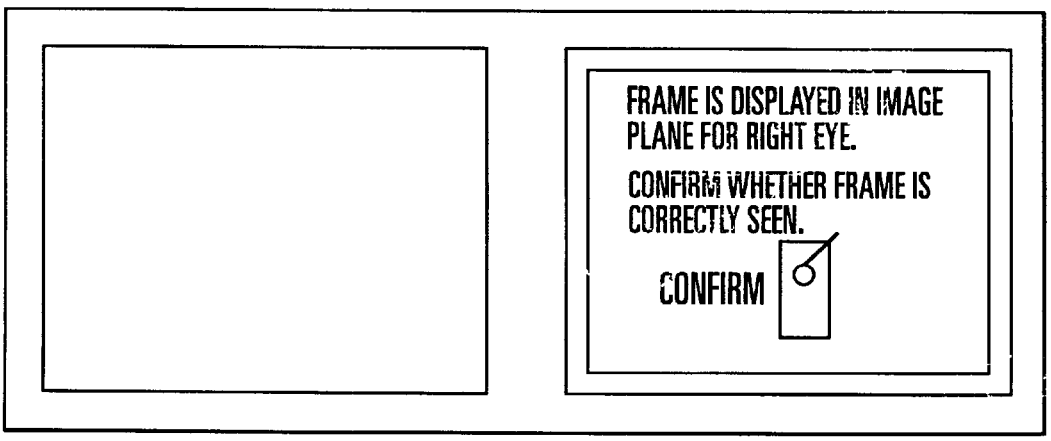
FIG. 7 is a diagram showing a display example of the mounting-state confirming figure in step S7 of FIG. 4.
Figure 8:
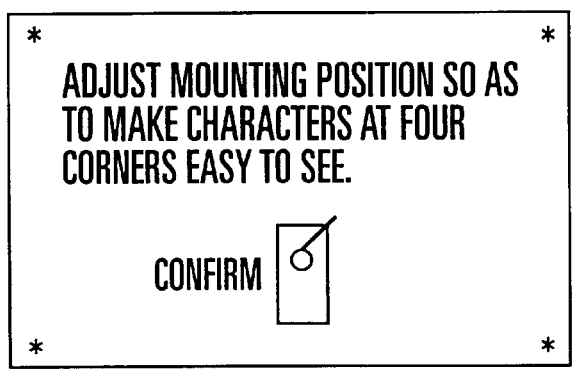
FIG. 8 is a diagram showing a display example of another mounting-state confirming figure in the head-mounted display apparatus shown in FIG. 2.
Figure 9:
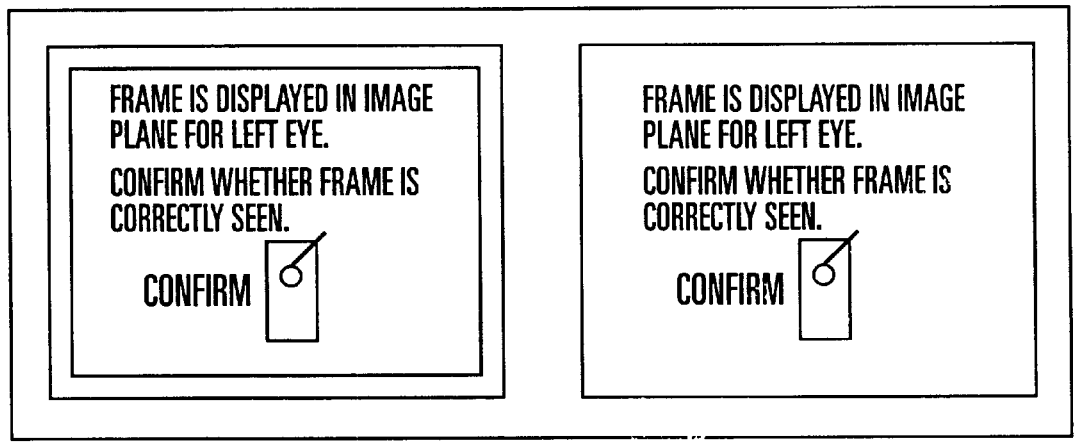
FIG. 9 is a diagram showing another display example of the mounting-state confirming figure in the head-mounted display apparatus shown in FIG. 2.

In the first embodiment, a mounting-state confirmation processing for confirming the mounting state of the mounting unit 35 when the user has mounted the mounting unit 35 on the head is performed. The mounting-state confirmation processing will be described with reference to FIGS. 4 to 9. FIG. 4 is a flow chart showing the procedure for the mounting-state confirmation processing in the head-mounted display apparatus shown in FIG. 2. FIG. 5 is a diagram showing a display example of a mounting-state confirming figure in step S1 of FIG. 4. FIG. 6 is a diagram showing a display example of the mounting-state confirming figure in step S4 of FIG. 4. FIG. 7 is a diagram showing a display example of the mounting-state confirming figure in step S7 of FIG. 4. FIG. 8 is a diagram showing a display example of another mounting-state confirming figure in the head-mounted display apparatus shown in FIG. 2. FIG. 9 is a diagram showing another display example of the mounting-state confirming figure in the head-mounted display apparatus shown in FIG. 2.

The mounting-state confirmation processing is executed by the control means 7 when the user has mounted the mounting unit 35 on the head. In the mounting-state confirmation processing, referring to FIG. 4, in step S1, the control means 7 instructs the character generating part 10 to generate a mounting-state confirming figure, and causes the mounting-state confirming figure to be sent to and displayed on the left-eye display system 12 and the right-eye display system 28. Further, at the same time, the control means 7 sets, at a timer, a predetermined period of time for displaying the mounting-state confirming figure, and starts the timer. Here, on each image plane of the left-eye display system 12 and the right-eye display system 28, as shown in FIG. 5, a rectangular frame is displayed as the mounting-state confirming figure, and within the rectangular frame, character information representing the explanatory word of "ADJUST MOUNTING POSITION SO AS TO MAKE IMAGE PLANE FRAME EASY TO SEE." is displayed. Accordingly, the user is made to confirm the mounting state of the mounting unit 35 while viewing the mounting-state confirming figure with both the right and left eyes.

Subsequently, the flow proceeds to step S2, where a check is made to find if the time counted by the above-mentioned timer has become out. If not, the flow proceeds to step S3, where a check is made to find if the confirmation input has been effected. The confirmation input is effected by operating the operation button 47 when, while viewing the mounting-state confirming figure with both the right and left eyes, the user has considered that the mounting state of the mounting unit 35 is correct. If it is found that no confirmation input is effected, the flow returns to step S2. If the time counted by the timer becomes out without the confirmation input being effected, it is considered that the confirmation of the mounting state of the mounting unit 35 by the user has not been obtained. Accordingly, the flow proceeds to step S10, where the power supply circuit 1 is turned off, so that the present processing is brought to an end. If the confirmation input is effected before the time counted by the timer becomes out, the flow proceeds to step S4.

In step S4, the control means 7 causes the mounting-state confirming figure generated by the character generating part 10 to be sent to and displayed on the left-eye display system 12. Further, at the same time, the control means 7 sets, at a timer, a predetermined period of time for displaying the mounting-state confirming figure, and starts the timer. Here, on an image plane of the left-eye display system 12, as shown in FIG. 6, a rectangular frame is displayed as the mounting-state confirming figure, and within the rectangular frame, character information representing the explanatory word of "FRAME IS DISPLAYED IN IMAGE PLANE FOR LEFT EYE. CONFIRM WHETHER FRAME IS CORRECTLY SEEN." is displayed. On the other hand, on an image plane of the right-eye display system 28, the mounting-state confirming figure and the explanatory word are not displayed. Accordingly, the user is made to confirm the mounting state of the mounting unit 35 while viewing the mounting-state confirming figure with the left eye.

Subsequently, the flow proceeds to step S5, where a check is made to find if the time counted by the above-mentioned timer has become out. If not, the flow proceeds to step S6, where a check is made to find if the confirmation input has been effected. The confirmation input is effected by operating the operation button 47 when, while viewing the mounting-state confirming figure with the left eye, the user has considered that the mounting state of the mounting unit 35 is correct. If it is found that no confirmation input is effected, the flow returns to step S5. If the time counted by the timer becomes out without the confirmation input being effected, it is considered that the confirmation of the mounting state of the mounting unit 35 by the user has not been obtained. Accordingly, the flow proceeds to step S10, where the power supply circuit 1 is turned off, so that the present processing is brought to an end. If the confirmation input is effected before the time counted by the timer becomes out, the flow proceeds to step S7.

In step S7, the control means 7 causes the mounting-state confirming figure generated by the character generating part 10 to be sent to and displayed on the right-eye display system 28. Further, at the same time, the control means 7 sets, at a timer, a predetermined period of time for displaying the mounting-state confirming figure, and starts the timer. Here, on an image plane of the right-eye display system 28, as shown in FIG. 7, a rectangular frame is displayed as the mounting-state confirming figure, and within the rectangular frame, character information representing the explanatory word of "FRAME IS DISPLAYED IN IMAGE PLANE FOR RIGHT EYE. CONFIRM WHETHER FRAME IS CORRECTLY SEEN." is displayed. On the other hand, on an image plane of the left-eye display system 12, the mounting-state confirming figure and the explanatory word are not displayed. Accordingly, the user is made to confirm the mounting state of the mounting unit 35 while viewing the mounting-state confirming figure with the right eye.

Subsequently, the flow proceeds to step S8, where a check is made to find if the time counted by the above-mentioned timer has become out. If not, the flow proceeds to step S9, where a check is made to find if the confirmation input has been effected. The confirmation input is effected by operating the operation button 47 when, while viewing the mounting-state confirming figure with the right eye, the user has considered that the mounting state of the mounting unit 35 is correct. If it is found that no confirmation input is effected, the flow returns to step S8. If the time counted by the timer becomes out without the confirmation input being effected, it is considered that the confirmation of the mounting state of the mounting unit 35 by the user has not been obtained. Accordingly, the flow proceeds to step S10, where the power supply circuit 1 is turned off, so that the present processing is brought to an end. If the confirmation input is effected before the time counted by the timer becomes out, the present processing is brought to an end.

As described above, the user is made to confirm whether the mounting state of the mounting unit 35 is correct, while viewing sequentially each of the display of the mounting-state confirming figure on both the left-eye display system 12 and the right-eye display system 28, the display thereof on one of the left-eye display system 12 and the right-eye display system 28, and the display thereof on the other of the left-eye display system 12 and the right-eye display system 28. Accordingly, it is possible for the user to know the mounting state of the mounting unit 35 accurately and quickly.

Further, in a case where the mounting unit 35 is not correctly mounted on the head of the user, when the confirmation input is not effected until the time counted by the timer becomes out, i.e., when the user has considered that the mounting state of the mounting unit 35 is not correct, the power supply circuit 1 is automatically turned off. Therefore, it is possible to save a trouble such as the operation of turning off the power supply when performing the mounting again.

Figure 1:
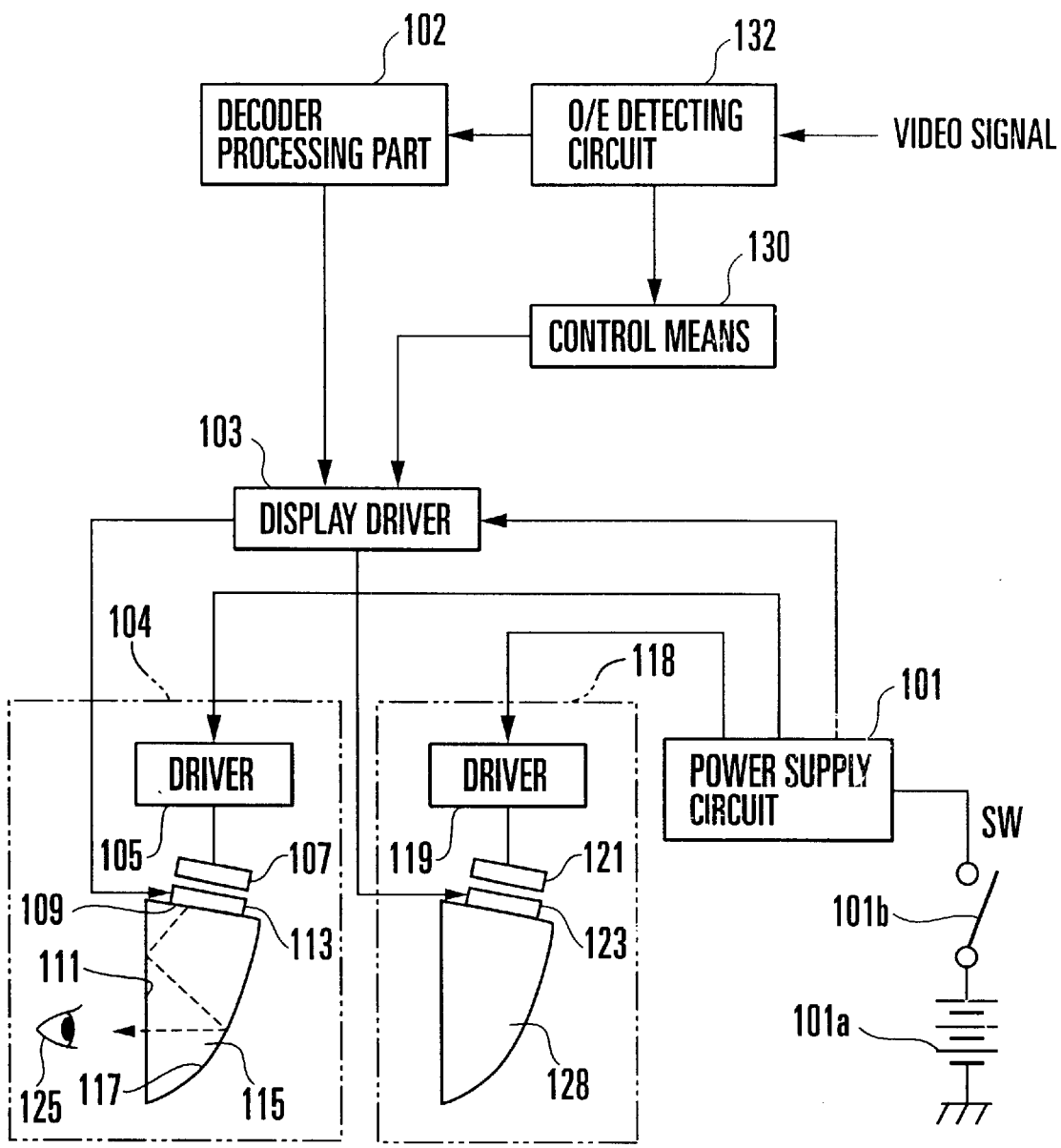
FIG. 1 is a block diagram showing the arrangement of one example of conventional head-mounted display apparatuses.

In addition, when the mounting-state confirming figure is displayed on only one of the left-eye display system 12 and the right-eye display system 28, it is unnecessary to discriminate for which of the left-eye display system 12 and the right-eye display system 28 a mounting-state confirming figure supplied from an external apparatus is provided as in the conventional apparatus. In other words, it is unnecessary to provide a detection circuit such as the O/E detecting circuit 132 (shown in FIG. 1) provided in the conventional apparatus to make the above discrimination. Accordingly, it is possible to not only reduce the size and weight of the apparatus but also lower the production cost.

Incidentally, in the first embodiment, with respect to the order of displaying the mounting-state confirming figure on only one of the left-eye display system 12 and the right-eye display system 28, the mounting-state confirming figure is displayed first on the left-eye display system 12 and, subsequently, is displayed on the right-eye display system 28. However, this order, of course, may be changed to the order of the right-eye display system 28 and the left-eye display system 12.

Moreover, while, in the first embodiment, a rectangular frame is used as the mounting-state confirming figure, the mounting-state confirming figure is not limited to the rectangular frame. For example, as shown in FIG. 8, characters "*", which are displayed at the four corners of an image plane, may be used as the mounting-state confirming figure. In addition, in the first embodiment, when the mounting-state confirming figure is displayed on only one of the left-eye display system 12 and the right-eye display system 28, a rectangular frame and an explanatory word are displayed on such one display system, while no display is made on the other display system. However, this setting may be changed to such setting that, as shown in FIG. 9, a rectangular frame and an explanatory word are displayed on such one display system while only the explanatory word is displayed on the other display system without the rectangular frame.

(Second Embodiment)

Figure 10:
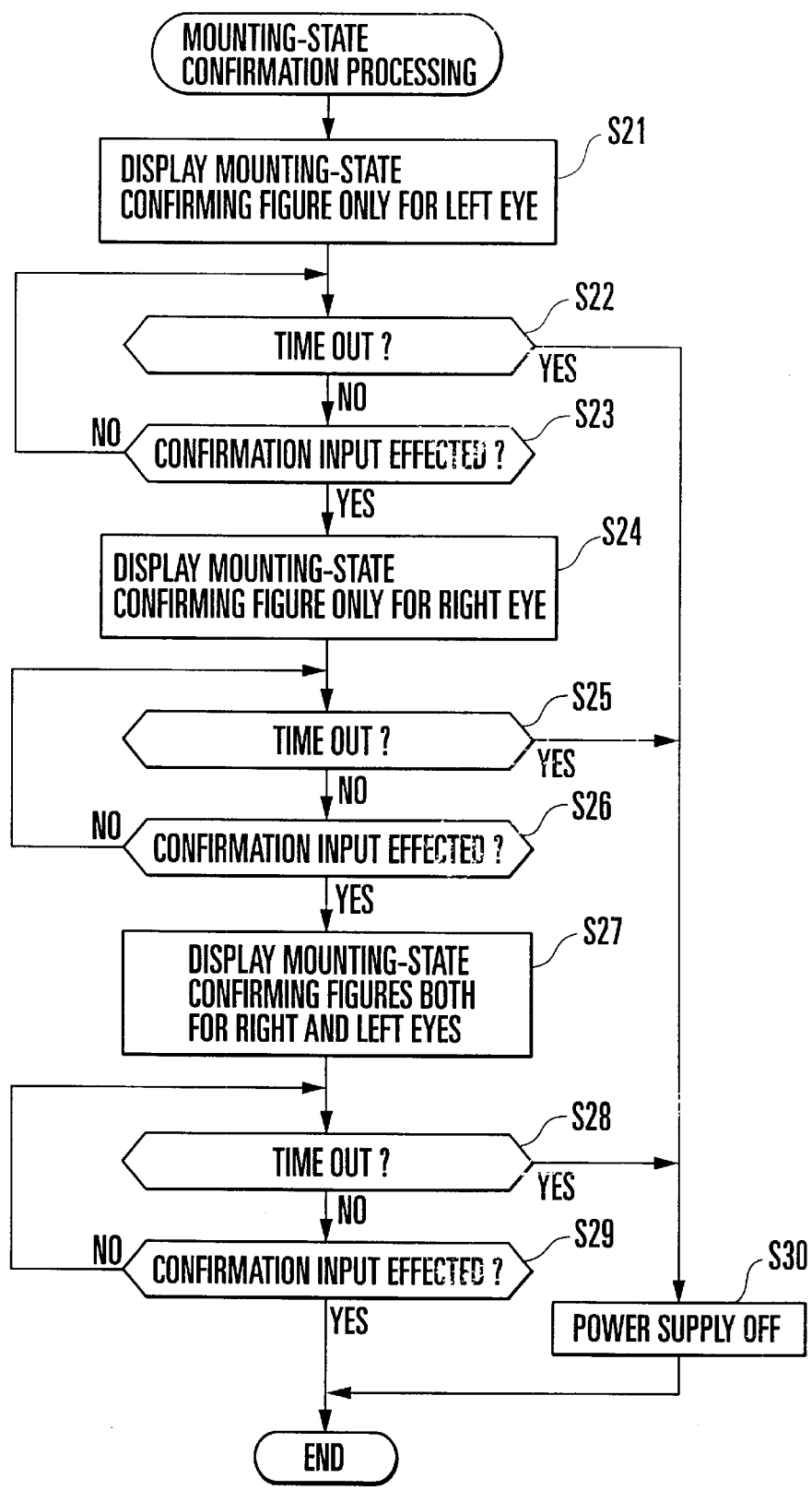
FIG. 10 is a flow chart showing the procedure for the mounting-state confirmation processing in a head-mounted display apparatus according to a second embodiment of the invention.

Next, a second embodiment of the invention will be described with reference to FIG. 10. FIG. 10 is a flow chart showing the procedure of the mounting-state confirmation processing in a head-mounted display apparatus according to the second embodiment of the invention. The construction of the second embodiment is the same as that of the first embodiment and is, therefore, omitted from the following description.

The second embodiment differs from the first embodiment in that the order of displaying the mounting-state confirming figure with respect to the left-eye display system 12 and the right-eye display system 28 is changed.

More specifically, in the mounting-state confirmation processing in the second embodiment, referring to FIG. 10, in step S21, the control means 7 instructs the character generating part 10 to generate a mounting-state confirming figure, and causes the mounting-state confirming figure to be sent to and displayed on the left-eye display system 12. Further, at the same time, the control means 7 sets, at a timer, a predetermined period of time for displaying the mounting-state confirming figure, and starts the timer. Here, on an image plane of the left-eye display system 12, in the same way as in the first embodiment, a rectangular frame serving as the mounting-state confirming figure and an explanatory word within the rectangular frame are displayed. On the other hand, on an image plane of the right-eye display system 28, the mounting-state confirming figure and the explanatory word are not displayed (see FIG. 6). Accordingly, the user is made to confirm the mounting state of the mounting unit 35 while viewing the mounting-state confirming figure with the left eye.

Subsequently, the flow proceeds to step S22, where a check is made to find if the time counted by the above-mentioned timer has become out. If not, the flow proceeds to step S23, where a check is made to find if the confirmation input has been effected. The confirmation input is effected by operating the operation button 47 when, while viewing the mounting-state confirming figure with the left eye, the user has considered that the mounting state of the mounting unit 35 is correct. If it is found that no confirmation input is effected, the flow returns to step S22. If the time counted by the timer becomes out without the confirmation input being effected, it is considered that the confirmation of the mounting state of the mounting unit 35 by the user has not been obtained. Accordingly, the flow proceeds to step S30, where the power supply circuit 1 is turned off, so that the present processing is brought to an end. If the confirmation input is effected before the time counted by the timer becomes out, the flow proceeds to step S24.

In step S24, the control means 7 causes the mounting-state confirming figure generated by the character generating part 10 to be sent to and displayed on the right-eye display system 28. Further, at the same time, the control means 7 sets, at a timer, a predetermined period of time for displaying the mounting-state confirming figure, and starts the timer. Here, on an image plane of the right-eye display system 28, in the same way as in the first embodiment, a rectangular frame serving as the mounting-state confirming figure and an explanatory word within the rectangular frame are displayed. On the other hand, on an image plane of the left-eye display system 12, the mounting-state confirming figure and the explanatory word are not displayed (see FIG. 7). Accordingly, the user is made to confirm the mounting state of the mounting unit 35 while viewing the mounting-state confirming figure with the right eye.

Subsequently, the flow proceeds to step S25, where a check is made to find if the time counted by the above-mentioned timer has become out. If not, the flow proceeds to step S26, where a check is made to find if the confirmation input has been effected. The confirmation input is effected by operating the operation button 47 when, while viewing the mounting-state confirming figure with the right eye, the user has considered that the mounting state of the mounting unit 35 is correct. If it is found that no confirmation input is effected, the flow returns to step S25. If the time counted by the timer becomes out without the confirmation input being effected, it is considered that the confirmation of the mounting state of the mounting unit 35 by the user has not been obtained. Accordingly, the flow proceeds to step S30, where the power supply circuit 1 is turned off, so that the present processing is brought to an end. If the confirmation input is effected before the time counted by the timer becomes out, the flow proceeds to step S27.

In step S27, the control means 7 causes the mounting-state confirming figure generated by the character generating part 10 to be sent to and displayed on the left-eye display system 12 and the right-eye display system 28. Further, at the same time, the control means 7 sets, at a timer, a predetermined period of time for displaying the mounting-state confirming figure, and starts the timer. Here, on each image plane of the left-eye display system 12 and the right-eye display system 28, in the same way as in the first embodiment, a rectangular frame is displayed as the mounting-state confirming figure, and within the rectangular frame, character information representing the explanatory word of "ADJUST MOUNTING POSITION SO AS TO MAKE IMAGE PLANE FRAME EASY TO SEE." is displayed (see FIG. 5). Accordingly, the user is made to confirm the mounting state of the mounting unit 35 while viewing the mounting-state confirming figure with both the right and left eyes.

Subsequently, the flow proceeds to step S28, where a check is made to find if the time counted by the above-mentioned timer has become out. If not, the flow proceeds to step S29, where a check is made to find if the confirmation input has been effected. The confirmation input is effected by operating the operation button 47 when, while viewing the mounting-state confirming figure with both the right and left eyes, the user has considered that the mounting state of the mounting unit 35 is correct. If it is found that no confirmation input is effected, the flow returns to step S28. If the time counted by the timer becomes out without the confirmation input being effected, it is considered that the confirmation of the mounting state of the mounting unit 35 by the user has not been obtained. Accordingly, the flow proceeds to step S30, where the power supply circuit 1 is turned off, so that the present processing is brought to an end. If the confirmation input is effected before the time counted by the timer becomes out, the present processing is brought to an end.

As described above, the user is made to confirm whether the mounting state of the mounting unit. 35 is correct, while viewing sequentially each of the display of the mounting-state confirming figure on one of the left-eye display system 12 and the right-eye display system 28, the display thereof on the other of the left-eye display system 12 and the right-eye display system 28, and the display thereof on both the left-eye display system 12 and the right-eye display system 28. Accordingly, it is possible for the user to know the mounting state of the mounting unit 35 accurately and quickly.

(Third Embodiment)

Figure 11:
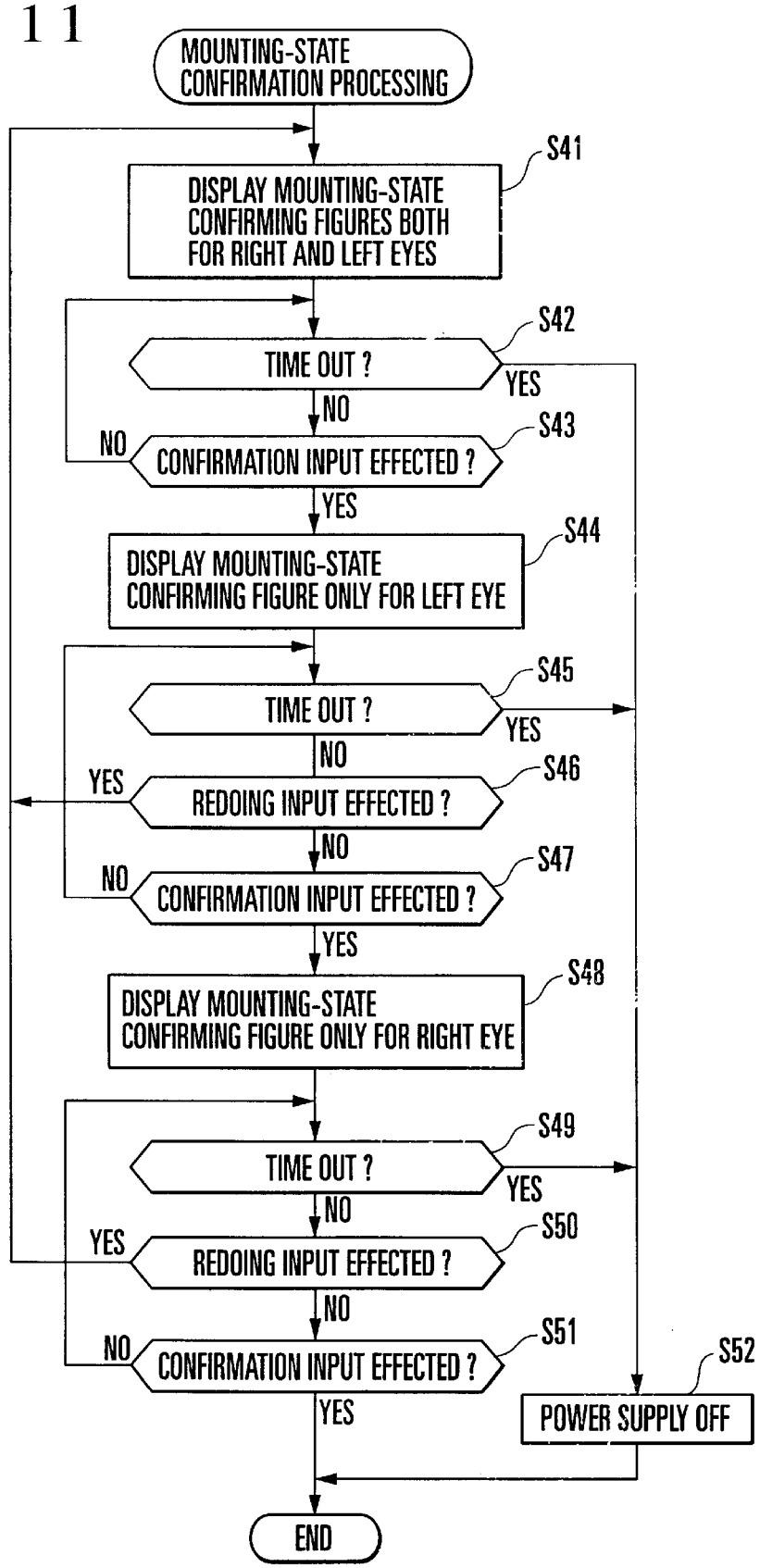
FIG. 11 is a flow chart showing the procedure for the mounting-state confirmation processing in a head-mounted display apparatus according to a third embodiment of the invention.

Next, a third embodiment of the invention will be described with reference to FIG. 11. FIG. 11 is a flow chart showing the procedure of the mounting-state confirmation processing in a head-mounted display apparatus according to the third embodiment of the invention. The construction of the third embodiment is the same as that of the first embodiment and is, therefore, omitted from the following description.

The third embodiment differs from the first embodiment in that the display of the mounting-state confirming figure is permitted to be performed again after the mounting-state confirming figure is displayed on either one of the left-eye display system 12 and the right-eye display system 28.

More specifically, in the mounting-state confirmation processing in the third embodiment, referring to FIG. 11, in step S41, the control means 7 instructs the character generating part 10 to generate a mounting-state confirming figure, and causes the mounting-state confirming figure to be sent to and displayed on the left-eye display system 12 and the right-eye display system 28. Further, at the same time, the control means 7 sets, at a timer, a predetermined period of time for displaying the mounting-state confirming figure, and starts the timer. Here, on each image plane of the left-eye display system 12 and the right-eye display system 28, in the same way as in the first embodiment, a rectangular frame is displayed as the mounting-state confirming figure, and within the rectangular frame, character information representing the explanatory word of "ADJUST MOUNTING POSITION SO AS TO MAKE IMAGE PLANE FRAME EASY TO SEE." is displayed (see FIG. 5). Accordingly, the user is made to confirm the mounting state of the mounting unit 35 while viewing the mounting-state confirming figure with both the right and left eyes.

Subsequently, the flow proceeds to step S42, where a check is made to find if the time counted by the above-mentioned timer has become out. If not, the flow proceeds to step S43, where a check is made to find if the confirmation input has been effected. The confirmation input is effected by operating the operation button 47 when, while viewing the mounting-state confirming figure with both the right and left eyes, the user has considered that the mounting state of the mounting unit 35 is correct. If it is found that no confirmation input is effected, the flow returns to step S42. If the time counted by the timer becomes out without the confirmation input being effected, it is considered that the confirmation of the mounting state of the mounting unit 35 by the user has not been obtained. Accordingly, the flow proceeds to step S52, where the power supply circuit 1 is turned off, so that the present processing is brought to an end. If the confirmation input is effected before the time counted by the timer becomes out, the flow proceeds to step S44.

In step S44, the control means 7 causes the mounting-state confirming figure generated by the character generating part 10 to be sent to and displayed on the left-eye display system 12. Further, at the same time, the control means 7 sets, at a timer, a predetermined period of time for displaying the mounting-state confirming figure, and starts the timer. Here, on an image plane of the left-eye display system 12, in the same way as in the first embodiment, a rectangular frame serving as the mounting-state confirming figure and an explanatory word within the rectangular frame are displayed. On the other hand, on an image plane of the right-eye display system 28, the mounting-state confirming figure and the explanatory word are not displayed (see FIG. 6). Accordingly, the user is made to confirm the mounting state of the mounting unit 35 while viewing the mounting-state confirming figure with the left eye.

Subsequently, the flow proceeds to step S45, where a check is made to find if the time counted by the above-mentioned timer has become out. If not, the flow proceeds to step S46, where a check is made to find if the redoing input has been effected. The redoing input is effected by operating the operation button 47 when, while viewing the mounting-state confirming figure with the left eye, the user has considered that the mounting state of the mounting unit 35 is not correct. It is to be noted that the manner of the operation of the operation button 47 for effecting the redoing input is different from that for effecting the confirmation input. Here, if the redoing input is effected, the flow returns to step S41, so that the mounting-state confirming figure is again displayed on both the left-eye display system 12 and the right-eye display system 28. On the other hand, if it is found that no redoing input is effected, the flow proceeds to step S47, where a check is made to find if the confirmation input has been effected. The confirmation input is effected by operating the operation button 47 when, while viewing the mounting-state confirming figure with the left eye, the user has considered that the mounting state of the mounting unit 35 is correct. If it is found that no confirmation input is effected, the flow returns to step S45. If the time counted by the timer becomes out without the redoing input and the confirmation input being effected, it is considered that the confirmation of the mounting state of the mounting unit 35 by the user has not been obtained. Accordingly, the flow proceeds to step S52, where the power supply circuit 1 is turned off, so that the present processing is brought to an end. If the confirmation input is effected before the time counted by the timer becomes out, the flow proceeds to step S48.

In step S48, the control means 7 causes the mounting-state confirming figure generated by the character generating part 10 to be sent to and displayed on the right-eye display system 28. Further, at the same time, the control means 7 sets, at a timer, a predetermined period of time for displaying the mounting-state confirming figure, and starts the timer. Here, on an image plane of the right-eye display system 28, in the same way as in the first embodiment, a rectangular frame serving as the mounting-state confirming figure and an explanatory word within the rectangular frame are displayed. On the other hand, on an image plane of the left-eye display system 12, the mounting-state confirming figure and the explanatory word are not displayed (see FIG. 7). Accordingly, the user is made to confirm the mounting state of the mounting unit 35 while viewing the mounting-state confirming figure with the right eye.

Subsequently, the flow proceeds to step S49, where a check is made to find if the time counted by the above-mentioned timer has become out. If not, the flow proceeds to step S50, where a check is made to find if the redoing input has been effected. The redoing input is effected by operating the operation button 47 when, while viewing the mounting-state confirming figure with the right eye, the user has considered that the mounting state of the mounting unit 35 is not correct. Here, if the redoing input is effected, the flow returns to step S41, so that the mounting-state confirming figure is again displayed on both the left-eye display system 12 and the right-eye display system 28. On the other hand, if it is found that no redoing input is effected, the flow proceeds to step S51, where a check is made to find if the confirmation input has been effected. The confirmation input is effected by operating the operation button 47 when, while viewing the mounting-state confirming figure with the right eye, the user has considered that the mounting state of the mounting unit 35 is correct. If it is found that no confirmation input is effected, the flow returns to step S49. If the time counted by the timer becomes out without the redoing input and the confirmation input being effected, it is considered that the confirmation of the mounting state of the mounting unit 35 by the user has not been obtained. Accordingly, the flow proceeds to step S52, where the power supply circuit 1 is turned off, so that the present processing is brought to an end. If the confirmation input is effected before the time counted by the timer becomes out, the present processing is brought to an end.

As has been described above, if the redoing input is effected when it is considered that the mounting state of the mounting unit 35 is not correct, the respective displays beginning with the display of the mounting-state confirming figure on both the left-eye display system 12 and the right-eye display system 28 are repeated. Accordingly, it is possible to reconfirm the mounting state of the mounting unit 35 with ease.

(Fourth Embodiment)

Figure 12:
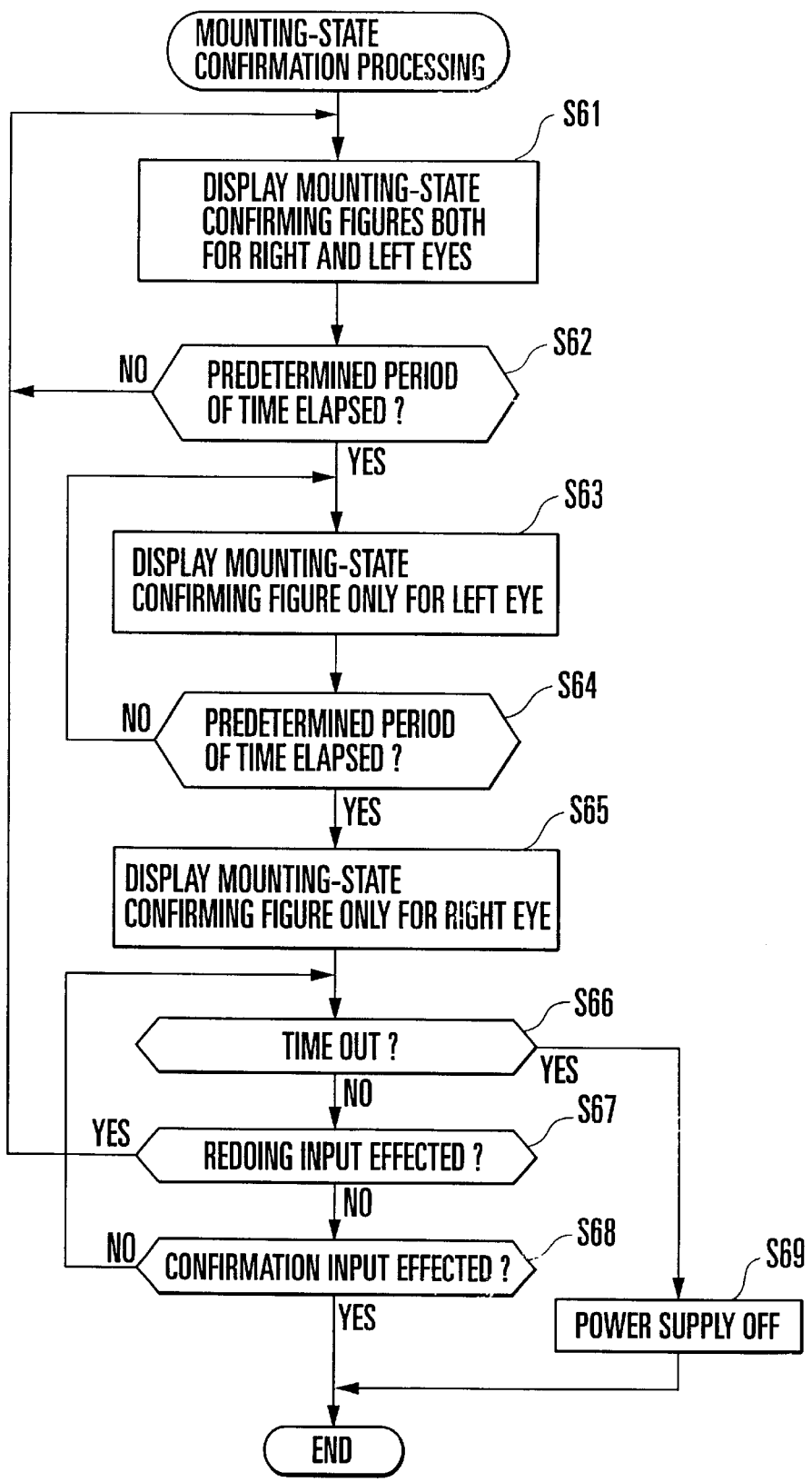
FIG. 12 is a flow chart showing the procedure for the mounting-state confirmation processing in a head-mounted display apparatus according to a fourth embodiment of the invention.

Next, a fourth embodiment of the invention will be described with reference to FIG. 12. FIG. 12 is a flow chart showing the procedure of the mounting-state confirmation processing in a head-mounted display apparatus according to the fourth embodiment of the invention. The construction of the fourth embodiment is the same as that of the first embodiment and is, therefore, omitted from the following description.

The fourth embodiment differs from the first embodiment in that the display of the mounting-state confirming figure on both the left-eye display system 12 and the right-eye display system 28, the display thereof on one of the left-eye display system 12 and the right-eye display system 28 and the display thereof on the other of the left-eye display system 12 and the right-eye display system 28 are changed over one after another every time a predetermined period of time elapses, and the redoing input and the confirmation input are effected after the last display is performed.

More specifically, in the mounting-state confirmation processing in the fourth embodiment, referring to FIG. 12, in step S61, the control means 7 instructs the character generating part 10 to generate a mounting-state confirming figure, and causes the mounting-state confirming figure to be sent to and displayed on the left-eye display system 12 and the right-eye display system 28. Further, at the same time, the control means 7 sets, at a timer, a predetermined display period of time for defining the period of time for displaying the mounting-state confirming figure, and starts the timer. Here, on each image plane of the left-eye display system 12 and the right-eye display system 28, in the same way as in the first embodiment, a rectangular frame serving as the mounting-state confirming figure and an explanatory word within the rectangular frame are displayed (see FIG. 5). Accordingly, the user is made to confirm the mounting state of the mounting unit 35 while viewing the mounting-state confirming figure with both the right and left eyes.

Subsequently, the flow proceeds to step S62, a check is made to find if the time counted by the above-mentioned timer has exceeded the predetermined display period of time. If not, the flow returns to step S61 to continue the display of the mounting-state confirming figure on both the left-eye display system 12 and the right-eye display system 28.

On the other hand, when the time counted by the above-mentioned timer has exceeded the predetermined display period of time, the flow proceeds to step S63. In step S63, the control means 7 causes the mounting-state confirming figure to be sent to and displayed on the left-eye display system 12. Further, at the same time, the control means 7 sets, at a timer, a predetermined display period of time for displaying the mounting-state confirming figure, and starts the timer. Here, on an image plane of the left-eye display system 12, in the same way as in the first embodiment, a rectangular frame serving as the mounting-state confirming figure and an explanatory word within the rectangular frame are displayed (see FIG. 6). Accordingly, the user is made to confirm the mounting state of the mounting unit 35 while viewing the mounting-state confirming figure with the left eye.

Subsequently, the flow proceeds to step S64, a check is made to find if the time counted by the above-mentioned timer has exceeded the predetermined display period of time. If not, the flow returns to step S63 to continue the display of the mounting-state confirming figure on the left-eye display system 12.

On the other hand, when the time counted by the above-mentioned timer has exceeded the predetermined display period of time, the flow proceeds to step S65. In step S65, the control means 7 causes the mounting-state confirming figure to be sent to and displayed on the right-eye display system 28. Further, at the same time, the control means 7 sets, at a timer, a predetermined period of time obtained by adding an operation inputting period of time to a predetermined display period of time for displaying the mounting-state confirming figure, and starts the timer. Here, on an image plane of the right-eye display system 28, in the same way as in the first embodiment, a rectangular frame serving as the mounting-state confirming figure and an explanatory word within the rectangular frame are displayed (see FIG. 7). Accordingly, the user is made to confirm the mounting state of the mounting unit 35 while viewing the mounting-state confirming figure with the right eye.

Subsequently, the flow proceeds to step S66, where a check is made to find if the time counted by the above-mentioned timer has become out. If not, the flow proceeds to step S67, where a check is made to find if the redoing input has been effected. The redoing input is effected by operating the operation button 47 when, while viewing the mounting-state confirming figure with both the right and left eyes, with only the left eye or with only the right eye, the user has considered that the mounting state of the mounting unit 35 is not correct. Here, if the redoing input is effected, the flow returns to step S61, so that the mounting-state confirming figure is again displayed on both the left-eye display system 12 and the right-eye display system 28. On the other hand, if it is found that no redoing input is effected, the flow proceeds to step S68, where a check is made to find if the confirmation input has been effected. The confirmation input is effected by operating the operation button 47 when, while viewing the mounting-state confirming figure with both the right and left eyes, with only the left eye and with only the right eye, the user has considered that the mounting state of the mounting unit 35 is correct. If it is found that no confirmation input is effected, the flow returns to step S66. If the time counted by the timer becomes out without the redoing input and the confirmation input being effected, it is considered that the confirmation of the mounting state of the mounting unit 35 by the user has not been obtained. Accordingly, the flow proceeds to step S69, where the power supply circuit 1 is turned off, so that the present processing is brought to an end. If the confirmation input is effected before the time counted by the timer becomes out, the present processing is brought to an end.

As has been described above, if the redoing input is effected when it is considered that the mounting state of the mounting unit 35 is not correct, the respective displays beginning with the display of the mounting-state confirming figure on both the left-eye display system 12 and the right-eye display system 28 are repeated. Accordingly, it is possible to reconfirm the mounting state of the mounting unit 35 with ease.

As has been described in the foregoing, there is generated a mounting-state confirming figure for confirming the mounting state of a mounting unit when the mounting unit has been mounted on a part of the body of a user, and, in accordance with the inputting of a confirmation operation by the user, a state of displaying the mounting-state confirming figure both on left-eye image display means and right-eye image display means, a state of displaying the mounting-state confirming figure on one of the left-eye image display means and the right-eye image display means, and a state of displaying the mounting-state confirming figure on the other of the left-eye image display means and the right-eye image display means are changed over one after another. Accordingly, it is possible for the user to know the mounting state of the mounting unit accurately.

Further, there is held the order of displaying a mounting-state confirming figure among a first display state of displaying the mounting-state confirming figure both on left-eye image display means and right-eye image display means, a second display state of displaying the mounting-state confirming figure on one of the left-eye image display means and the right-eye image display means, and a third display state of displaying the mounting-state confirming figure on the other of the left-eye image display means and the right-eye image display means. Then, the mounting-state confirming figure is displayed in the display state according to the held displaying order. When, after performing the display, the confirmation input is effected, the mounting-state confirming figure is displayed in the next display state according to the held displaying order. Subsequently, when, after performing the display, the confirmation input is effected, the mounting-state confirming figure is displayed in the next display state according to the held displaying order. Accordingly, it is possible for the user to know the mounting state of the mounting unit accurately.

(Fifth Embodiment)

Next, a head-mounted display apparatus according to a fifth embodiment of the invention will be described.

In general, since a head-mounted display apparatus supplies a video image to a user in the state of being mounted on the head or the like of the user, if the user uses the head-mounted display apparatus continuously for a long time, the user is liable to run into such usage circumstances as to impair pleasantness, for example, fatigue of the eyes. Therefore, it is necessary to caution the user against the continuous long-time usage of the head-mounted display apparatus. For that purpose, a precautionary notice is set forth in an instruction manual of the head-mounted display apparatus, so as to advise the user to avoid the continuous long-time usage of the head-mounted display apparatus.

However, in a conventional head-mounted display apparatus, in a case where the user is absorbed in observing a video image, the user often forgets the above precautionary notice and uses the head-mounted display apparatus continuously for a long time, thereby being liable to run into such usage circumstances as to impair pleasantness.

An object of the fifth embodiment is, therefore, to provide a head-mounted display apparatus capable of preventing the user from running into such usage circumstances as to impair pleasantness due to the continuous long-time usage thereof, and a method of displaying the warning therefor.

Thus, in accordance with the fifth embodiment, there is provided a head-mounted display apparatus which comprises video image display means for displaying an inputted video image, optical means for leading the displayed video image to each of right and left eyes of a user, warning information generating means for generating warning information, control means for controlling the video image display means to display the video image, and determination means for monitoring a continuous displaying time for which the video image display means continues displaying the video image from starting to display the video image and for determining whether the continuous displaying time has reached a predetermined period of time, wherein, when the continuous displaying time has reached the predetermined period of time, the control means causes the video image display means to display the warning information.

Figure 13:
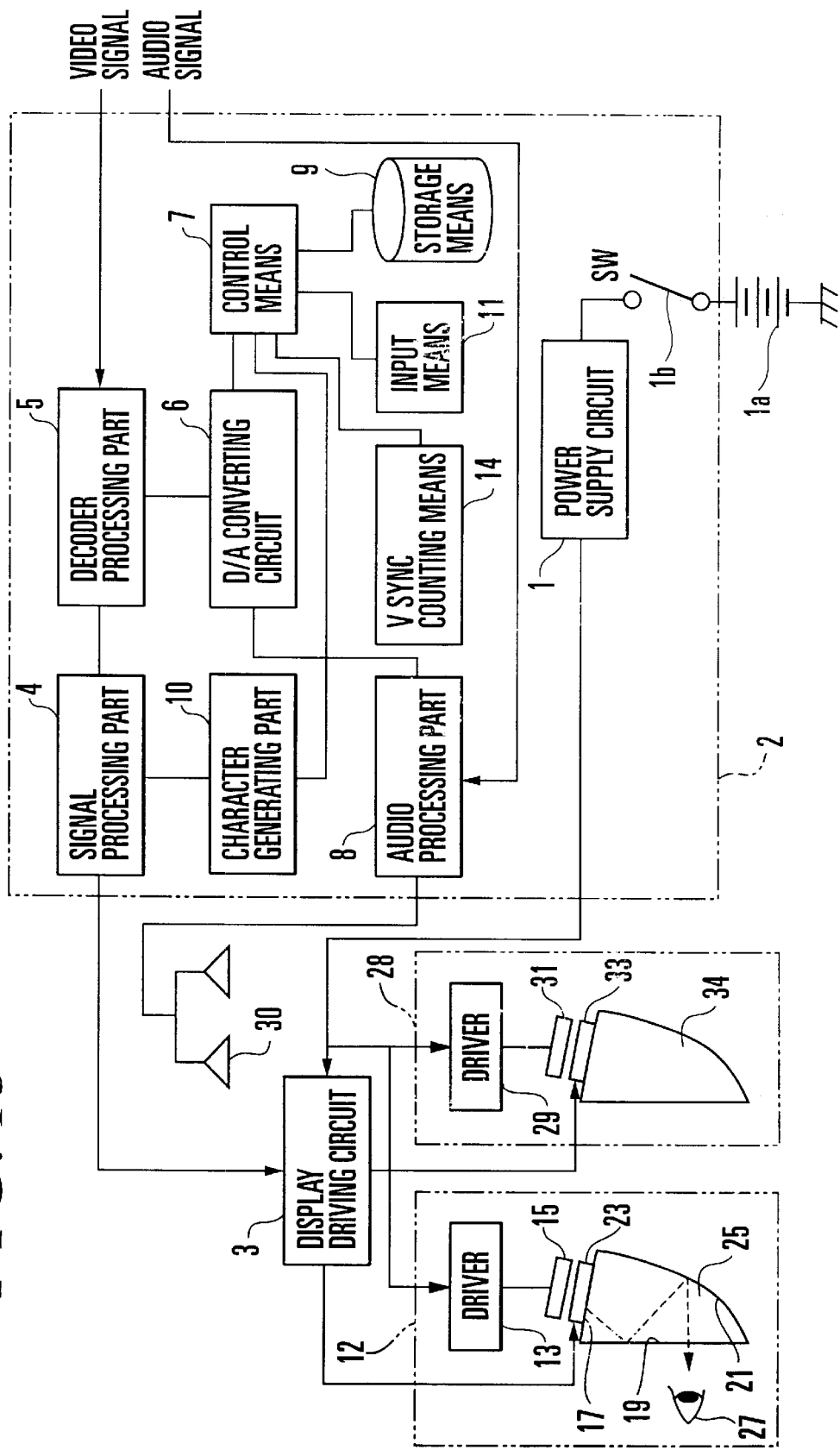
FIG. 13 is a block diagram showing the arrangement of a head-mounted display apparatus according to a fifth embodiment of the invention.

FIG. 13 is a block diagram showing the arrangement of a head-mounted display apparatus according to the fifth embodiment of the invention. The appearance of the head-mounted display apparatus according to the fifth embodiment is the same as that in the first embodiment shown in FIG. 3.

The details of the arrangement of the head-mounted display apparatus according to the fifth embodiment are shown in FIG. 13. The arrangement of the fifth embodiment differs from that of the first embodiment shown in FIG. 2 in that not only the input means 11 and the storage means 9 but also a V sync counting means 14 for counting a vertical synchronizing signal included in the video signal is connected to the control means 7. Then, the control means 7 is composed of a CPU, a memory, a timer, etc., and is arranged to perform the setting of actions on the basis of inputs form the input means 7 and to control the set actions. The V sync counting means 14 starts counting a vertical synchronizing signal included in the inputted video signal following the start of displaying a video image, and supplies its count value to the control means 7. The control means 7 compares with the count value of the V sync counting means 14 with a predetermined count value stored beforehand in the storage means 9, and, when the count value of the V sync counting means 14 has reached the predetermined count value, considers that a continuous displaying time has reached a predetermined period of time, then performing a warning display processing operation as will be described later. In FIG. 13, the components similar to those shown in FIG. 2 are denoted by the same reference numerals as in FIG. 2, and are, therefore, omitted from the description.

The decoder processing part 5 converts the inputted video signal into R, G and B signals in accordance with the video parameters represented by the respective analog signals as inputted. Then, the R, G and B signals are inputted to the signal processing part 4. The signal processing part 4 outputs the R, G and B signals supplied from the decoder processing part 5 and an image signal outputted from the character generating part 10 independently from each other, or combines the R, G and B signals with the image signal, according to necessity, and outputs the combined signals. The character generating part 10 forms, in accordance with an instruction from the control means 7, signals for a caution and a warning word for the user and for image plane adjusting data related to brightness, color, etc.

Figure 14:
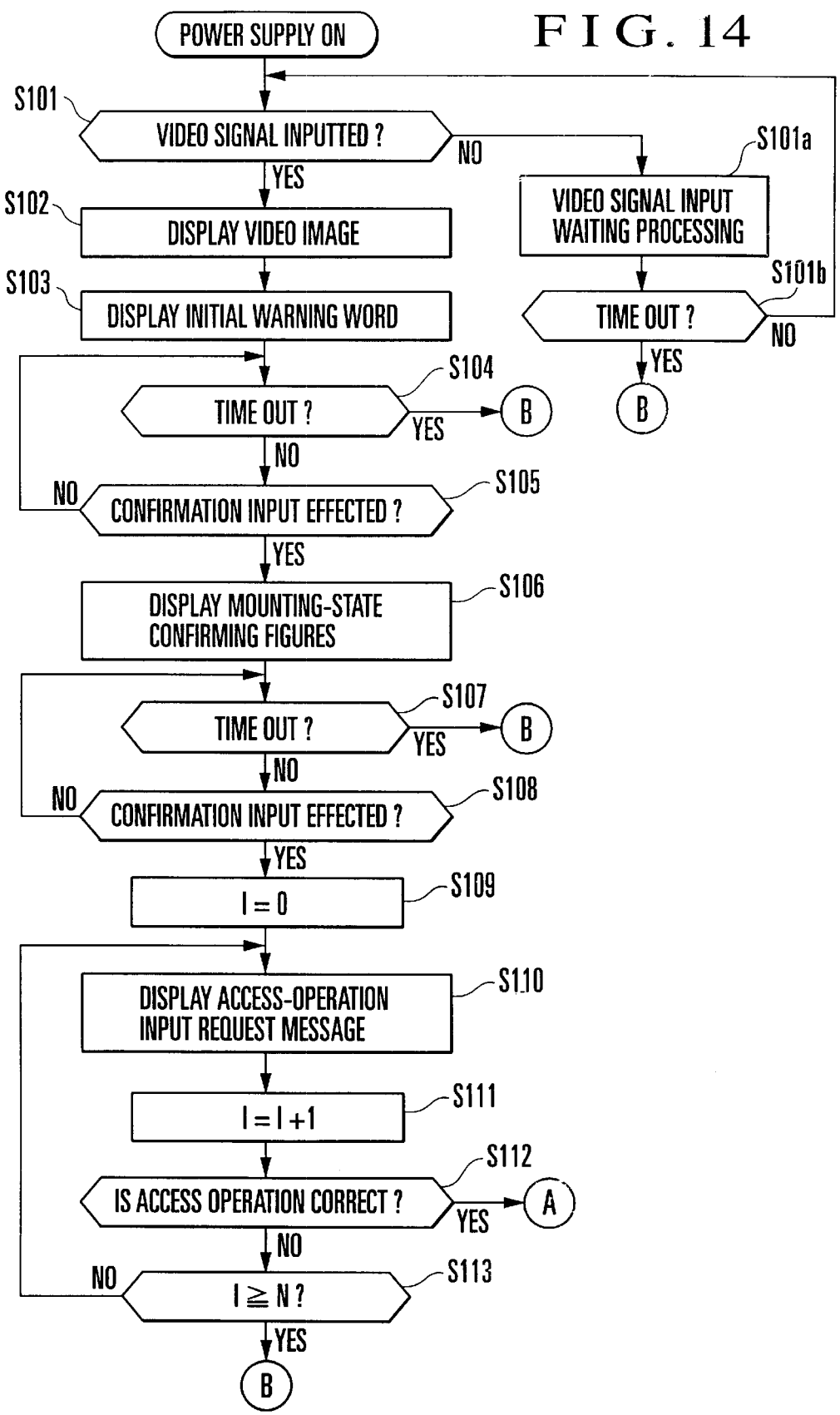
FIG. 14 is a flow chart showing the procedure for the video image display operation control in the head-mounted display apparatus shown in FIG. 13.
Figure 15:
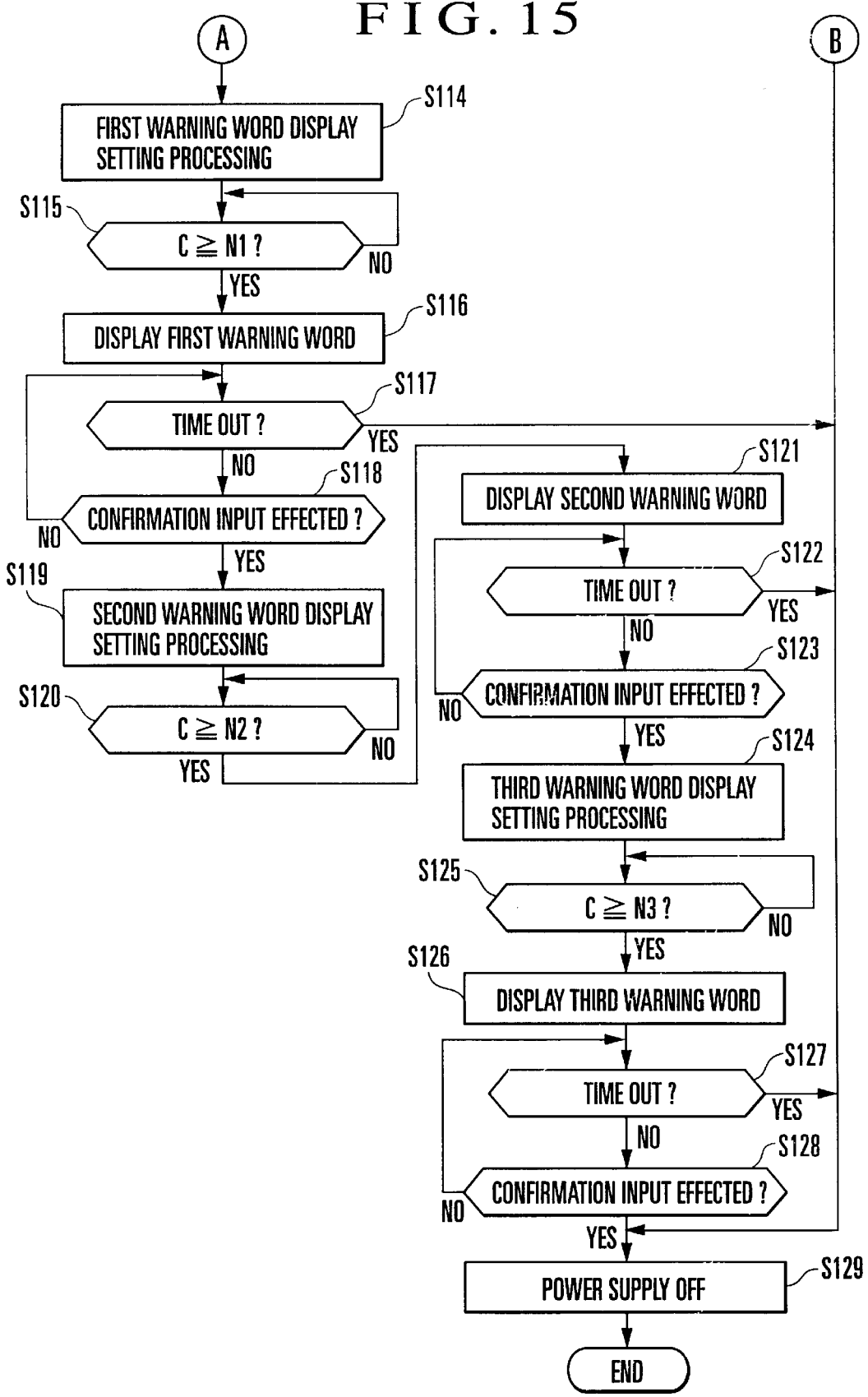
FIG. 15 is a flow chart showing the procedure for the video image display operation control in the head-mounted display apparatus shown in FIG. 13.
Figure 16:
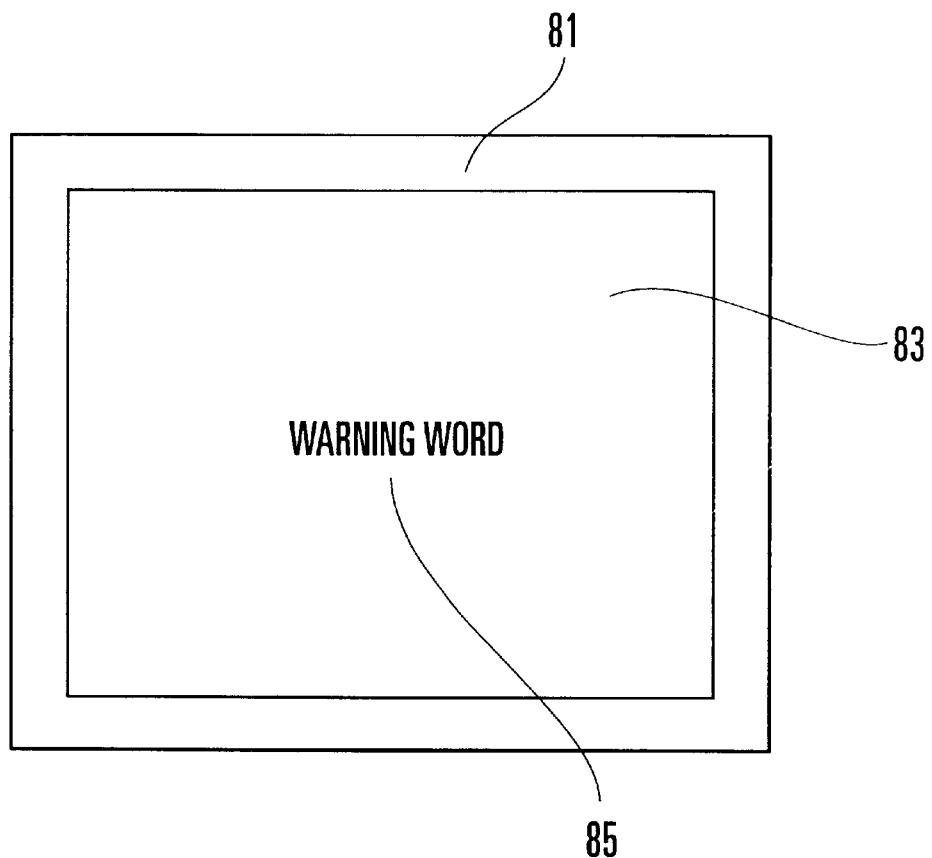
FIG. 16 is a diagram showing a display example of an initial warning word in step S103 of FIG. 14.
Figure 17:
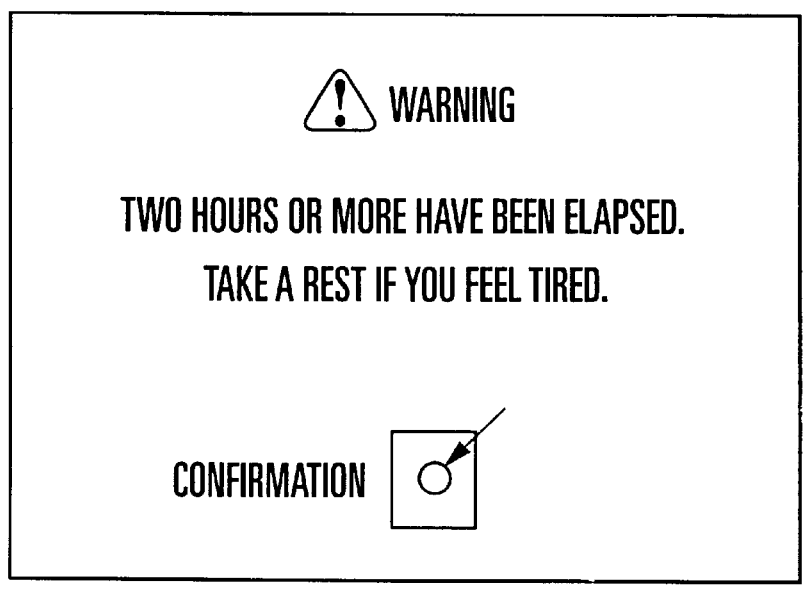
FIG. 17 is a diagram showing a display example of a first warning word in step S114 of FIG. 15.

In the fifth embodiment, the control means 7 controls a video image display operation in such a way that, when a continuous displaying time has reached a predetermined period of time, a warning display processing operation for displaying a warning word is performed. The video image display operation control in the head-mounted display apparatus according to the fifth embodiment will be described with reference to FIGS. 14 to 19. FIGS. 14 and 15 are flow charts showing the procedure for the video image display operation control in the head-mounted display apparatus shown in FIG. 13. FIG. 16 is a diagram showing a display example of an initial warning word in step S103 of FIG. 14. FIG. 17 is a diagram showing a display example of a first warning word in step S114 of FIG. 15. FIG. 18 is a diagram showing a display example of a second warning word in step S119 of FIG. 15. FIG. 19 is a diagram showing a display example of a third warning word in step S126 of FIG. 15.

When the power supply circuit 1 is turned on, referring to FIG. 14, in step S101, a check is made for the presence or absence of inputting of a video signal supplied from an external apparatus. If the video signal is being inputted from the external apparatus, the flow proceeds to step S102. On the other hand, if no video signal is being inputted from the external apparatus, the flow proceeds to step S101a, where a video signal input waiting processing is performed. In the video signal input waiting processing, the control means 7 instructs the character generating part 10 to generate a message for advising the user to input a video signal, and causes the message to be sent to and displayed on the left-eye display system 12 and the right-eye display system 28. In the subsequent step S101b, the control means 7 monitors the inputting of a video signal until a predetermined period of time elapses from the time of starting displaying the message. Then, a check is made to find if the inputting of a video signal is detected before the predetermined period of time elapses. At the time before the predetermined period of time elapses, the flow returns to step S101. If the inputting of a video signal is detected before the time becomes out in step S101b, the flow proceeds to step S102 through step S101. On the other hand, if the inputting of a video signal is not detected before the predetermined period of time elapses (the time becoming out), the flow proceeds to step S129 shown in FIG. 15, where the power supply circuit 1 is turned off, and the present processing is brought to an end.

In step S102, the control means 7 causes a video signal to be sent to the left-eye display system 12 and the right-eye display system 28 so as to display a video image. In the subsequent step S103, the control means 7 instructs the character generating part 10 to generate an initial warning word, and causes the initial warning word to be displayed on the left-eye display system 12 and the right-eye display system 28 in the state of being superposed on the video image. Further, at the same time, the control means 7 sets, at a timer, a predetermined displaying period of time for displaying the initial warning word, and starts the timer. Here, on each image plane of the left-eye display system 12 and the right-eye display system 28, as shown in FIG. 16, the initial warning word 85 is displayed within an initial-warning-word displaying area 83 which is superposed on a video image displaying area 81. The initial warning word 85 is composed of character information representing the restriction of the long-time usage, the measures against an unpleasant feeling, etc. The color of such character information is set to one of three original colors, i.e., red, green and blue. The color of the background of the character information is set to black. In addition, the color of the background of the character information may be set to a color obtained by combining the original color of the character information with one of the three original colors which is different from the original color of the character information.

Subsequently, the flow proceeds to step S104, where a check is made to find if the time counted by the above-mentioned timer has become out. If not, the flow proceeds to step S105, where a check is made to find if the confirmation input has been effected. The confirmation input is effected by operating the operation button 47, or, if a remote-controller is used, an operation button provided on the remote-controller, when the user has viewed and understood the initial warning word. If it is found that no confirmation input is effected, the flow returns to step S104. If the time counted by the timer becomes out without the confirmation input being effected, it is considered that the understanding by the user has not been obtained. Accordingly, the flow proceeds to step S129 shown in FIG. 15, where the power supply circuit 1 is turned off, so that the present processing is brought to an end. If the confirmation input is effected before the time counted by the timer becomes out, the control means 7 stops the character generating part 10 from generating the initial warning ward. Then, the flow proceeds to step S106.

In step S106, the control means 7 instructs the character generating part 10 to generate a mounting-state confirming figure, and causes the mounting-state confirming figure to be sent to and displayed on the left-eye display system 12 and the right-eye display system 28. Further, at the same time, the control means 7 sets, at a timer, a predetermined displaying period of time for displaying the mounting-state confirming figure, and starts the timer. Accordingly, the user is made to confirm the mounting state of the mounting unit 35 while viewing the mounting-state confirming figure with both the right and left eyes.

Subsequently, the flow proceeds to step S107, where a check is made to find if the time counted by the above-mentioned timer has become out. If not, the flow proceeds to step S108, where a check is made to find if the confirmation input has been effected. The confirmation input is effected by operating the operation button 47 when, while viewing the mounting-state confirming figure with both the right and left eyes, the user has considered that the mounting state of the mounting unit 35 is correct. If it is found that no confirmation input is effected, the flow returns to step S107. If the time counted by the timer becomes out without the confirmation input being effected, it is considered that the confirmation of the mounting state of the mounting unit 35 by the user has not been obtained. Accordingly, the flow proceeds to step S129 shown in FIG. 15, where the power supply circuit 1 is turned off, so that the present processing is brought to an end. If the confirmation input is effected before the time counted by the timer becomes out, the control means 7 stops the character generating part 10 from generating the initial warning ward. Then, the flow proceeds to step S109.

In step S109, a variable I for indicating the number of times of inputting of an access operation, such as a password, is initialized to "0". In the subsequent step S110, the control means 7 instructs the character generating part 10 to generate an access-operation input request message, and causes the access-operation input request message to be sent to and displayed on the left-eye display system 12 and the right-eye display system 28 together with a video image. Further, at the same time, the control means 7 sets, at a timer, a predetermined displaying period of time for displaying the access-operation input request message, and starts the timer. Here, on each image plane of the left-eye display system 12 and the right-eye display system 28, the access-operation input request message and the video image are displayed in the state of being superposed on each other. Upon viewing the access-operation input request message, the user is made to input the access operation by operating the operation button 47.

Subsequently, the flow proceeds to step S111, where the variable I is incremented by one. In the subsequent step S112, a check is made to find if the inputted access operation is correct. If not, the flow proceeds to step S113, a check is made to find if the variable I is not less than a predetermined number of times N. If the variable I is less than the predetermined number of times N, the flow returns to step S110, repeating the incrementing of the variable I and the determination of correctness of the inputted access operation. If the correct access operation is not inputted before the variable I becomes equal to or larger than the predetermined number of times N, the flow proceeds to step S129 shown in FIG. 15, where the power supply circuit 1 is turned off, so that the present processing is brought to an end. On the other hand, if the correct access operation is inputted before the variable I becomes equal to or larger than the predetermined number of times N, the control means 7 stops the character generating part 10 from generating the access-operation input request message. Then, the flow proceeds to step S114 shown in FIG. 15.

In step S114, a first warning word display setting processing is performed. In the first warning word display setting processing, the control means 7 starts the V sync counting means 14 and successively takes in count values C of the V sync counting means 14 so as to compare each count value C with a predetermined count value N1 stored in the storage means 9. Here, the predetermined count value N1 is a value corresponding to a first continuous displaying period of time for a video image. In the subsequent step S115, a check is made to find if the count value C of the V sync counting means 14 has become not less than the predetermined count value N1. If the count value C has become not less than the predetermined count value N1, it is considered that the continuous displaying period of time has exceeded the first continuous displaying period of time, so that the flow proceeds to step S116. In step S116, the control means 7 instructs the character generating part 10 to generate a first warning word to be displayed in the state of being superposed on a video image, and, at the same time, sets, at a timer, a predetermined displaying period of time for displaying the first warning word. The first warning word is composed of, for example, as shown in FIG. 17, the explanatory sentences of "TWO HOURS OR MORE HAVE BEEN ELAPSED. TAKE A REST IF YOU FEEL TIRED.". Further, the color of such character information is set, similar to the initial warning word, to one of three original colors, i.e., red, green and blue, and the color of the background of the first warning word is set to black or to a color obtained by combining the original color of the first warning word with one of the three original colors which is different from the original color of the first warning word. Upon reviewing the first warning word, the user is made to know that two hours or more have elapsed from the start of displaying a video image. Further, there is displayed a character indicating the operation button 47 for advising the user to effect the confirmation input when viewing and understanding the first warning word.

Subsequently, the flow proceeds to step S117, where a check is made to find if the time counted by the above-mentioned timer has become out. If not, the flow proceeds to step S118, where a check is made to find if the confirmation input has been effected. The confirmation input is effected by operating the operation button 47 when the user has viewed the first warning word and understood the lapse of the period of time. If it is found that no confirmation input is effected, the flow returns to step S117. If the time counted by the timer becomes out without the confirmation input being effected, it is considered that the understanding of the first warning word by the user has not been obtained.

Accordingly, the flow proceeds to step S129, where the power supply circuit 1 is turned off, so that the present processing is brought to an end. If the confirmation input is effected before the time counted by the timer becomes out, the control means 7 stops the character generating part 10 from generating the first warning ward. Then, the flow proceeds to step S119. Incidentally, the continuous displaying period of time may be selected from among a plurality of periods of time.

In step S119, a second warning word display setting processing is performed. In the second warning word display setting processing, the control means 7 starts the V sync counting means 14 and successively takes in count values C of the V sync counting means 14 so as to compare each count value C with a predetermined count value N2 stored in the storage means 9. Here, the predetermined count value N2 is a value corresponding to a second continuous displaying period of time for a video image. In the subsequent step S120, a check is made to find if the count value C of the V sync counting means 14 has become not less than the predetermined count value N2. If the count value C has become not less than the predetermined count value N2, it is considered that the continuous displaying period of time has exceeded the second continuous displaying period of time, so that the flow proceeds to step S121. In step S121, the control means 7 instructs the character generating part 10 to generate a second warning word to be displayed in the state of being superposed on a video image, and, at the same time, sets, at a timer, a predetermined displaying period of time for displaying the second warning word. The second warning word is composed of, for example, as shown in FIG. 18, the explanatory sentences of "FOUR HOURS WILL ELAPSE SOON. POWER SUPPLY WILL BE CUT OFF IN FIFTEEN MINUTES.". Further, the color of such character information is set, similar to the initial warning word, to one of three original colors, i.e., red, green and blue, and the color of the background of the second warning word is set to black or a color obtained by combining the original color of the second warning word with one of the three original colors which is different from the original color of the second warning word. Upon reviewing the second warning word, the user is made to know that such a period of time as to give fatigue to the user (here, four hours) is about to elapse from the start of displaying a video image. Further, there is displayed a character indicating the operation button 47 for advising the user to effect the confirmation input when viewing and understanding the second warning word.

Subsequently, the flow proceeds to step S122, where a check is made to find if the time counted by the above-mentioned timer has become out. If not, the flow proceeds to step S123, where a check is made to find if the confirmation input has been effected. The confirmation input is effected by operating the operation button 47 when the user has viewed the second warning word and understood the lapse of the period of time. If it is found that no confirmation input is effected, the flow returns to step S122. If the time counted by the timer becomes out without the confirmation input being effected, it is considered that the understanding of the second warning word by the user has not been obtained. Accordingly, the flow proceeds to step S129, where the power supply circuit 1 is turned off, so that the present processing is brought to an end. If the confirmation input is effected before the time counted by the timer becomes out, the control means 7 stops the character generating part 10 from generating the second warning ward. Then, the flow proceeds to step S124.

In step S124, a third warning word display setting processing is performed. In the third warning word display setting processing, the control means 7 starts the V sync counting means 14 and successively takes in count values C of the V sync counting means 14 so as to compare each count value C with a predetermined count value N3 stored in the storage means 9. Here, the predetermined count value N3 is a value corresponding to a third continuous displaying period of time (video image displaying ending time). In the subsequent step S125, a check is made to find if the count value C of the V sync counting means 14 has become not less than the predetermined count value N3. If the count value C has become not less than the predetermined count value N3, it is considered that the continuous displaying period of time has exceeded the third continuous displaying period of time, so that the flow proceeds to step S126. In step S126, the control means 7 instructs the character generating part 10 to generate a third warning word to be displayed in the state of being superposed on a video image, and, at the same time, sets, at a timer, a predetermined displaying period of time for displaying the third warning word. The third warning word is composed of, for example, as shown in FIG. 19, the explanatory sentences of "TAKE A REST BECAUSE FOUR HOURS OR MORE HAVE ELAPSED. POWER SUPPLY WILL BE CUT OFF AUTOMATICALLY.". Further, the color of such character information is set, similar to the initial warning word, to one of three original colors, i.e., red, green and blue, and the color of the background of the third warning word is set to black or a color obtained by combining the original color of the third warning word with one of the three original colors which is different from the original color of the third warning word. Upon reviewing the third warning word, the user is made to know that such a period of time as to give fatigue to the user (here, four hours) has elapsed and the power supply circuit 1 will be turned off automatically to stop displaying a video image. Further, there is displayed a character indicating the operation button 47 for advising the user to effect the confirmation input when viewing and understanding the third warning word.

Subsequently, the flow proceeds to step S127, where a check is made to find if the time counted by the above-mentioned timer has become out. If not, the flow proceeds to step S128, where a check is made to find if the confirmation input has been effected. The confirmation input is effected by operating the operation button 47 when the user has viewed the third warning word and understood the stop of displaying of a video image. If it is found that no confirmation input is effected, the flow returns to step S127. If the time counted by the timer becomes out without the confirmation input being effected, it is considered that the understanding of the third warning word by the user has not been obtained. Accordingly, the flow proceeds to step S129, where the power supply circuit 1 is turned off, so that the present processing is brought to an end. If the confirmation input is effected before the time counted by the timer becomes out, the control means 7 stops the character generating part 10 from generating the third warning ward. Then, the flow proceeds to step S129, where the power supply circuit 1 turned off, so that the present processing is brought to an end.

As described above, a continuous displaying period of time for a video image is measured by counting vertical synchronizing signals included in a video signal, and, when the continuous displaying period of time has reached a predetermined period of time (four hours in the case of the fifth embodiment), the power supply is automatically turned off. Therefore, it is possible to prevent the user from running into such usage circumstances as to impair pleasantness due to the continuous long-time usage of the head-mounted display apparatus. Further, it is possible to make the user know that the head-mounted display apparatus is being used for a long tome, by successively displaying the first, second and third warning words in that order according to the lapse of the continuous displaying time for a video image. In addition, before the continuous displaying time for a video image reaches a predetermined period of time (four hours in the case of the fifth embodiment), the user is beforehand let to know a period of time remaining until the power supply is automatically turned off, with the second warning word. Therefore, it is possible to prevent the user from mistaking the stopping of displaying of a video image due to the lapse of a predetermined period of time for a malfunction of the apparatus, or from being surprised at the stopping of displaying of a video image.

Moreover, the color of character information representing the initial warning word, the first warning word, the second warning word and the third warning word is set to one of three original colors, i.e., red, green and blue, and the color of the background of the character information is set to black or a color obtained by combining the original color of the character information with one of the three original colors which is different from the original color of the character information. Therefore, it is possible to mitigate the color deviation when each warning word is displayed, thereby making characters easy to see, so that it is surely giving a warning to the user.

Further, by gradually enlarging characters of warning words or changing colors of characters of warning words according to the progress of the three times of displaying of the warning words, it is possible to adopt such a displaying state as to call the attention of the user.

(Sixth Embodiment)

Figure 20:
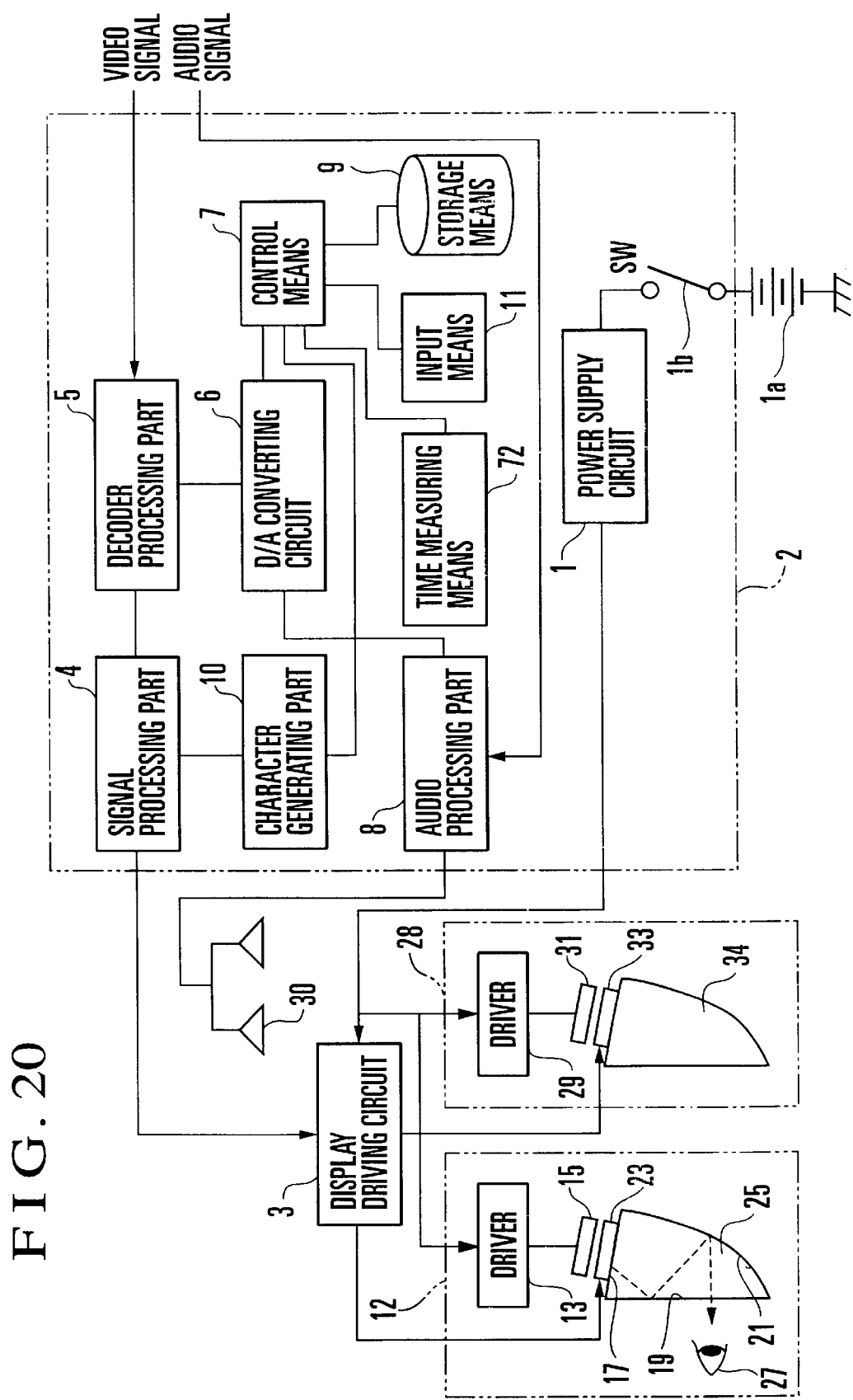
FIG. 20 is a block diagram showing the arrangement of a head-mounted display apparatus according to a sixth embodiment of the invention.

Next, a sixth embodiment of the invention will be described with reference to FIG. 20. FIG. 20 is a block diagrams showing a head-mounted display apparatus according to the sixth embodiment of the invention.

The sixth embodiment differs from the fifth embodiment in that, while in the fifth embodiment a continuous displaying time for a video image is measured by counting vertical synchronizing signals with the V sync counting means 14, the continuous displaying time is measured by-using a time measuring means 72, such as a timer.

In the head-mounted display apparatus according to the sixth embodiment, as shown in FIG. 20, the time measuring means 72 is provided in place of the V sync counting means 14 shown in FIG. 13. The time measuring means 72 starts measuring time following the start of displaying a video image, and supplies the measured time to the control means 7. The control means 7 compares with the measured time supplied from the time measuring means 72 with a predetermined period of time stored beforehand in the storage means 9, and, when the measured time has reached the predetermined period of time, performs a warning display processing operation as will be described later.

In other words, in the case of the sixth embodiment, in the flow chart relating to the fifth embodiment shown in FIG. 15, the processing operations in steps S115, S120 and S125 are respectively changed to such operations as to compare the measured time T obtained by the time measuring means 72 with predetermined periods of time Ta1, Ta2 and Ta3 stored beforehand in the storage means 9, thereby realizing the determination of whether the continuous displaying time has reached each predetermined period of time.

More specifically, in step S115 shown in FIG. 15, a check is made to find if whether the measured time T and the predetermined period of time Ta1 satisfy the relation of "T≧Ta1". In step S120, a check is made to find if whether the measured time T and the predetermined period of time Ta2 satisfy the relation of "T≧Ta2". In step S125, a check is made to find if whether the measured time T and the predetermined period of time Ta3 satisfy the relation of "T≧Ta3". The other processing operations are the same as those in the flow chart shown in FIG. 15, and are, therefore, omitted from the description.

(Seventh Embodiment)

Figure 21:
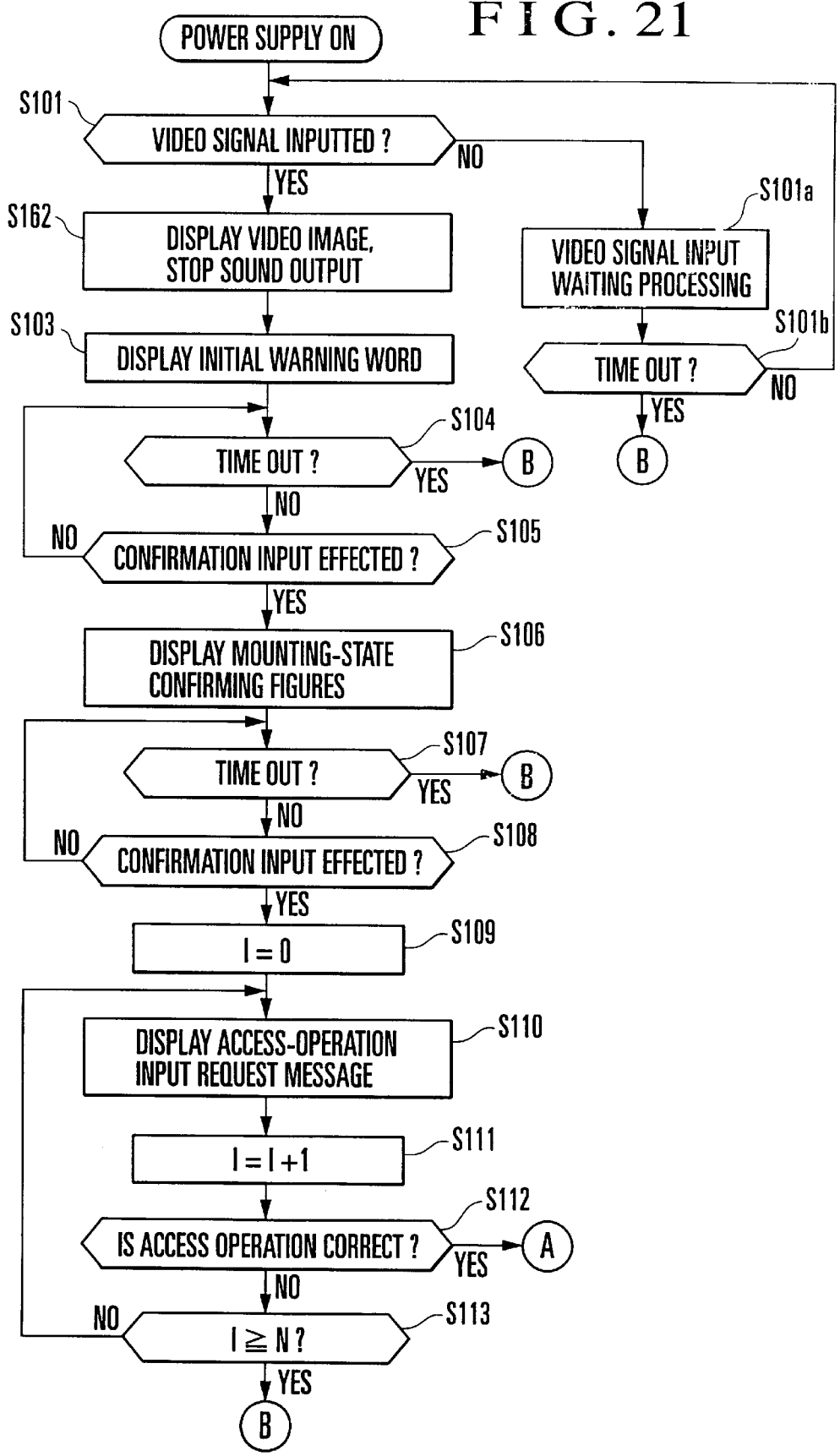
FIG. 21 is a flow chart showing the procedure for the video image display operation control in a head-mounted display apparatus according to a seventh embodiment of the invention.
Figure 22:
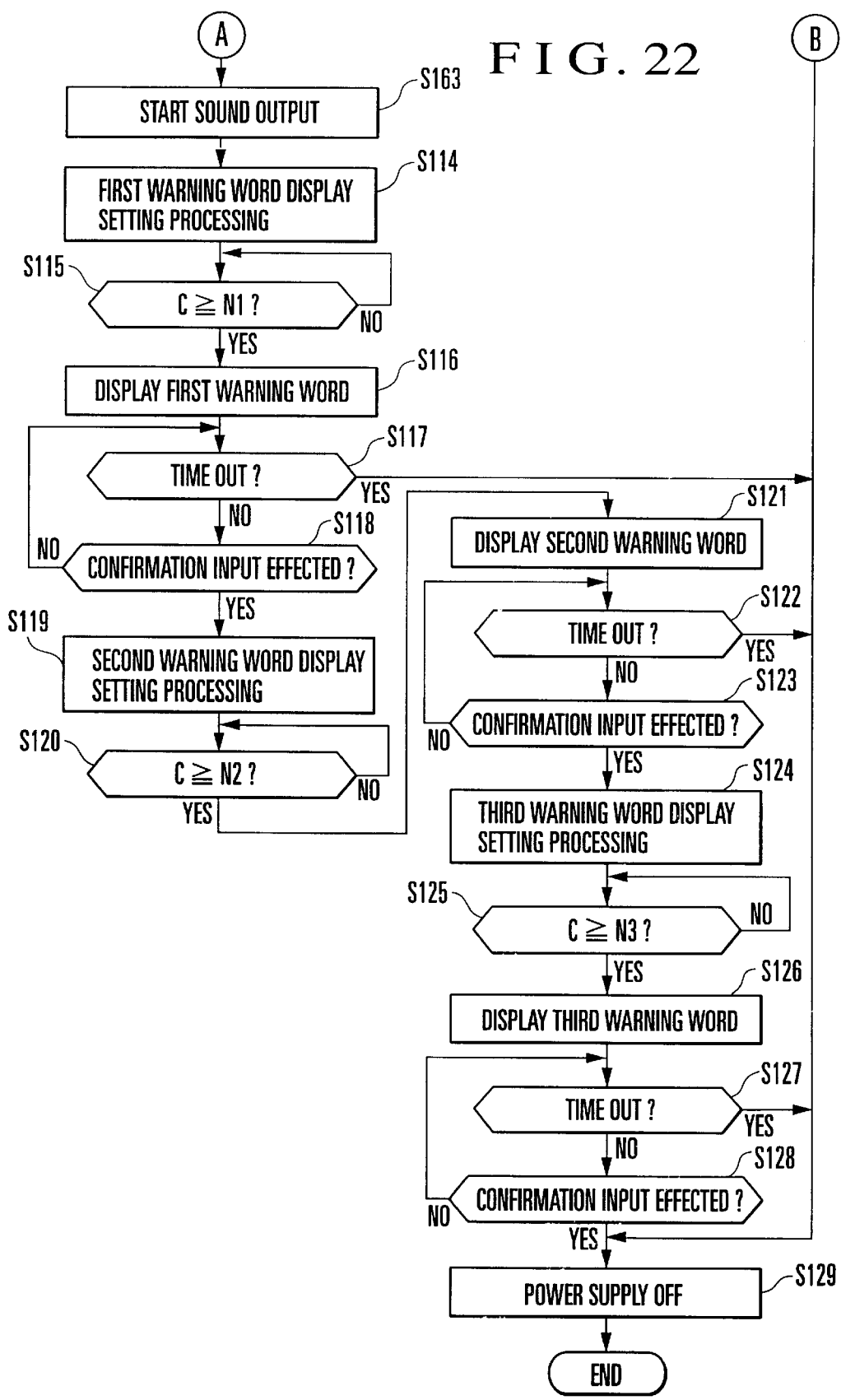
FIG. 22 is a flow chart showing the procedure for the video image display operation control in the head-mounted display apparatus according to the seventh embodiment of the invention.

Next, a seventh embodiment of the invention will be described with reference to FIGS. 21 and 22. FIGS. 21 and 22 are flow charts showing the procedure for the video image display operation control in a head-mounted display apparatus according to the seventh embodiment of the invention. The construction of the seventh embodiment is the same as that of the fifth embodiment and is, therefore, omitted from the following description. Further, in the seventh embodiment, the processing portions similar to those in the fifth embodiment are denoted by the same reference numerals as in the fifth embodiment and are, therefore, also omitted from the following description.

The seventh embodiment differs from the fifth embodiment in that the output of sound from the earphones 30 is stopped when the initial warning word is displayed. More specifically, the processing in step S162 is performed in place of step S102 shown in FIG. 14, and the processing in step S163 is performed in place of step S114 shown in FIG. 15.

Referring to FIG. 21, when the power supply circuit 1 is turned on, in step S101, a check is made for the presence or absence of inputting of a video signal supplied from an external apparatus. If the video signal is being inputted from the external apparatus, the flow proceeds to step S162.

In step S162, the control means 7 causes a video signal to be sent to and displayed on the left-eye display system 12 and the right-eye display system 28, and, at the same time, causes the audio processing part 8 to stop outputting an audio signal. Then, if, in step S112, it is determined that the correct access operation is inputted before the variable I reaches the predetermined number of times N, the control means 7 instructs the character generating part 10 to stop generating the access-operation input request message. Then, the flow proceeds to step S163.

In step S163, the control means 7 instructs the audio processing part 8 to output an audio signal. In the subsequent step S114, the first warning word display setting processing is performed. The subsequent processing operations are the same as those described in the fifth embodiment, and are, therefore, omitted from the description.

As described above, in the case of the seventh embodiment, the output of sound from the earphones 30 is stopped when the initial warning word is displayed. Therefore, it is possible to concentrate the attention of the user on the initial warning word, so that the initial warning word makes it possible to inform the user of a precaution in usage of the apparatus.

(Eighth Embodiment)

Next, an eighth embodiment of the invention will be described with reference to FIG. 23. FIG. 23 is a diagram showing a warning notice time changing/setting picture in a head-mounted display apparatus according to the eighth embodiment of the invention.

The eighth embodiment differs from each of the fifth to seventh embodiments in that periods of time for respectively displaying the first, second and third warning words are changeably set.

More specifically, in each of the fifth to seventh embodiments, the first warning word is displayed when the continuous displaying time for a video image reaches two hours, the second warning word is displayed when the continuous displaying time for a video image reaches three hours and forty-five minutes, and the third warning word is displayed when the continuous displaying time for a video image reaches four hours. On the other hand, in the eighth embodiment, the time after which each warning word is displayed is arbitrarily settable within a predetermined range by the operation of the user. For example, on an image plane, the time is displayed for each warning word, and the time is changeable by the operation of the operation button 47 or the like. Here, in a case where it is determined whether the continuous displaying time has reached each predetermined period of time by comparing the count value of the V sync counting means 14 with each predetermined count value stored beforehand in the storage means 9, the time set on the image plane is converted, by a predetermined arithmetic operation, into a count value corresponding thereto, and such a count value is stored in the storage means 9 as the predetermined count value. Further, in a case where the continuous displaying time is measured by the time measuring means 72, the time set on the image plane is stored in the storage means 9.

As described above, the time after which each warning word is displayed is settable within a predetermined range by the operation of the user. Therefore, it is possible to provide a warning display apposite to the individual user, so that the user is enabled to use the apparatus more pleasantly.

As has been described in the foregoing, a head-mounted display apparatus according to each of the fifth to eighth embodiments comprises warning information generating means for generating warning information, control means for controlling video image display means to display the video image, and determination means for monitoring a continuous displaying time for which the video image display means continues displaying the video image from starting to display the video image and for determining whether the continuous displaying time has reached a predetermined period of time, wherein, when the continuous displaying time has reached the predetermined period of time, the control means causes the video image display means to display the warning information. Accordingly, it is possible to beforehand prevent the user from running into such usage circumstances as to impair pleasantness due to the continuous long-time usage of the head-mounted display apparatus.

(Ninth Embodiment)

Next, a ninth embodiment of the invention will be described.

A characteristic feature of the ninth embodiment resides in that the display of a warning or the like for advising the user to refrain from the continuous long-time usage of a head-mounted display apparatus is controlled on the basis of a result of detection of the mounting state of the head-mounted display apparatus or the presence or absence of inputting of a video signal.

Since a conventional head-mounted display apparatus supplies a video image to the user in the state of being mounted on the head or the like of the user, if the user has used the head-mounted display apparatus continuously for a long time without being aware, the user is liable to run into such usage circumstances as to impair pleasantness, for example, fatigue of the eyes. For that purpose, a precautionary notice is set forth in an instruction manual of the head-mounted display apparatus, so as to advise the user to refrain from the continuous long-time usage of the head-mounted display apparatus.

However, in the conventional head-mounted display apparatus, in a case where the user is absorbed in observing a video image, the user often forgets the above precautionary notice and uses the head-mounted display apparatus continuously for a long time, thereby being liable to run into such usage circumstances as to impair pleasantness. Further, the user often does not confirm the presence or absence of inputting of a video signal when mounting the head-mounted display apparatus on the head or the like. In a case where the user mounts the head-mounted display apparatus on the head or the like while forgetting to input a video signal, no video image will start being displayed for a long, long time, so that the user at last notices that no video signal is being inputted. Thus, the conventional head-mounted display apparatus is inconvenient for the user.

It is an object of the ninth embodiment to provide a head-mounted display apparatus capable of beforehand preventing the user from running into such usage circumstances as to impair pleasantness due to the continuous long-time usage thereof and capable of improving the convenience for the user, and a warning display method for the head-mounted display apparatus.

Thus, in accordance with the ninth embodiment, there is provided a head-mounted display apparatus which comprises video image display means for displaying a video image represented by an inputted video signal and directing the displayed video image to each of right and left eyes of a user, warning information generating means for generating warning information for the user, video signal detecting means for detecting presence or absence of inputting of the video signal, and control means for controlling the video image to be displayed on the video image display means, wherein the control means controls the video image display means to display the warning information on the basis of a result of detection of the presence or absence of inputting of the video signal.

Figure 24:
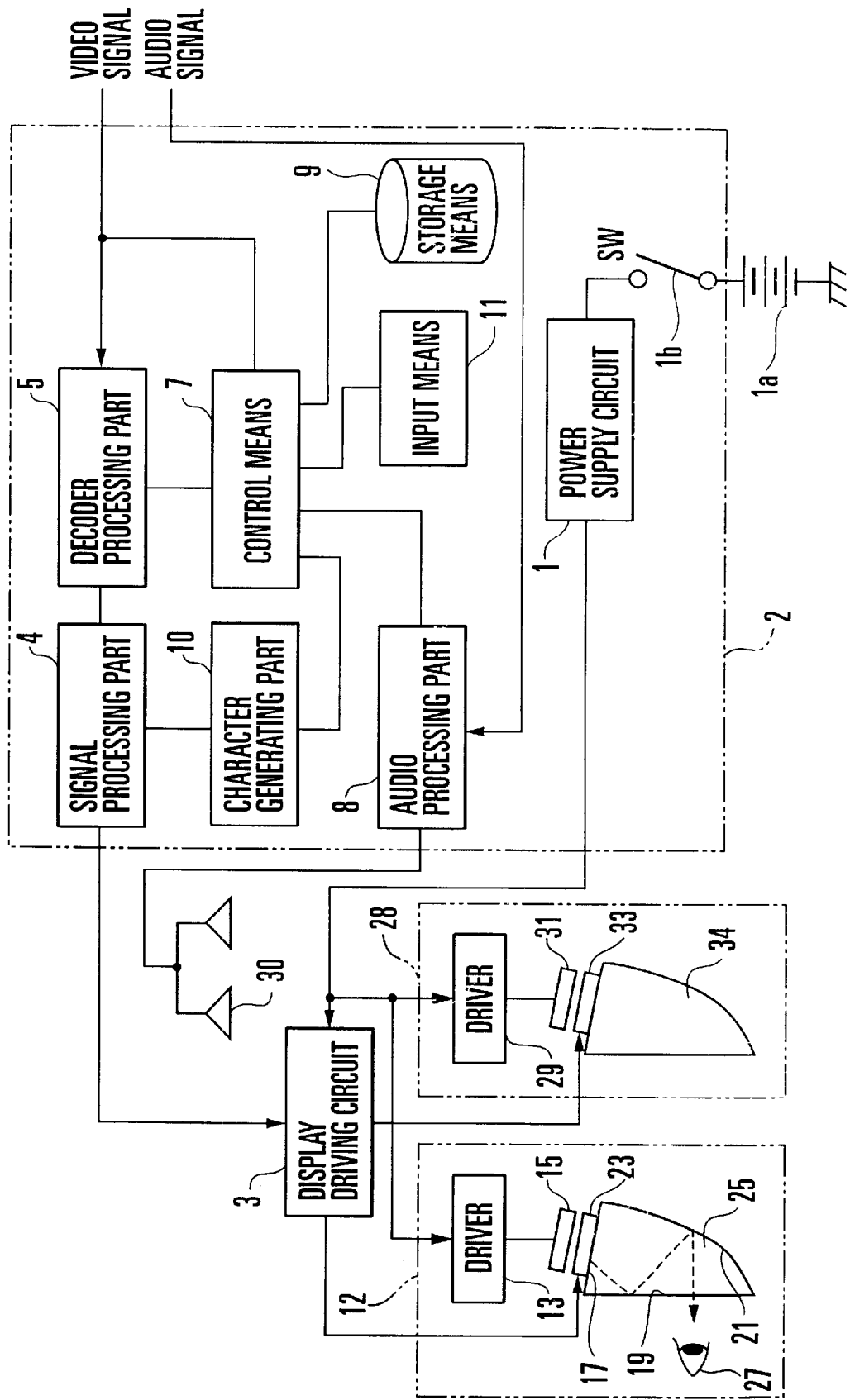
FIG. 24 is a block diagram showing the arrangement of a head-mounted display apparatus according to a ninth embodiment of the invention.
Figure 25:
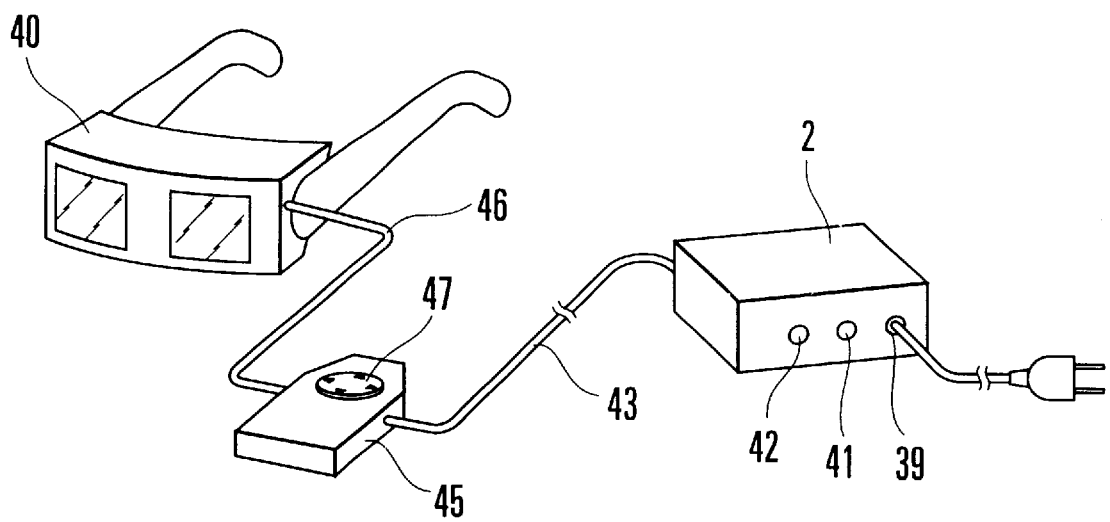
FIG. 25 is a perspective view showing the appearance of the head-mounted display apparatus shown in FIG. 24.

FIG. 24 is a block diagram showing the arrangement of a head-mounted display apparatus according to the ninth embodiment of the invention. FIG. 25 is a perspective view showing the appearance of the head-mounted display apparatus shown in FIG. 24.

The head-mounted display apparatus is provided, as shown in FIG. 25, with a relay box 2 for relaying between the apparatus and an external apparatus for supplying a video signal and an audio signal, a remote-controller 45, and a mounting unit 40 arranged to be mountable on a part of the body, such as the head, of a user. The relay box 2 is provided with a power supply jack 39 for connection with an external power supply, a video input jack 41 for inputting a video signal (NTSC signal) supplied from the external apparatus, for example, a TV tuner or a video reproducing apparatus, and an audio input jack 42 for inputting an audio signal from the external apparatus. The relay box 2 contains, as will be described later, a number of blocks for realizing the various functions, such as a power supply function, a video signal processing function and an audio signal processing function, and supplies a video signal (R, G and B signals), an audio signal, a control signal, electric power, etc., to the mounting unit 40 through cables 43 and 46.

The remote-controller 45 is arranged to communicate with the relay box 2 through the cable 43, and is provided with an operation button 47. The operation button 47 serves as a power supply switch, an input switch for a video signal, an action setting switch, a confirmation operation switch, etc. By operating the operation button 47, instructions for turning-on/off of the power supply and for adjusting the brightness, tint, color density, sound volume, sound tone, sound balance, etc., of a display image plane of the head-mounted display apparatus and an instruction for a confirmation input operation are outputted to the relay box 2.

The mounting unit 40 is provided, as will be described later, with a left-eye display system and a right-eye display system for displaying a video image represented by the supplied video signal, enlarging the video image, and, then, leading the video image to the left eye and the right eye of the user.

The details of the arrangement of the head-mounted display apparatus will be described. Referring to FIG. 24, the relay box 2 contains a decoder processing part 5 for inputting a video signal supplied from the external apparatus, an audio processing part 8 for inputting an audio signal supplied from the external apparatus, a control means 7 and a power supply circuit 1. To the control means 7, there are connected an input means 11 and a storage means 9. The control means 7, which is composed of a CPU, a memory, a timer, etc., performs the setting of actions, etc., on the basis of inputs from the input means 11, and performs a control operation related to the action as set. The input means 11 inputs the operation of the operation button 47 (shown in FIG. 25), and supplies to the control means 7 a signal corresponding to the inputted operation. Further, the control means 7 reads out a plurality of video parameters (brightness, tint, color density, etc.) and a plurality of audio parameters (sound volume, balance, sound tone, etc.) from the storage means 9, and sends these parameters after the D/A converting process. Here, the respective video parameters are inputted to the decoder processing part 5, and the respective audio parameters are inputted to the audio processing part 8. Further, the control means 7 has the function of monitoring the presence or absence of inputting of a video signal The decoder processing part 5 converts the inputted video signal into R, G and B signals in accordance with the video parameters as inputted. Then, the R, G and B signals are inputted to a signal processing part 4. The signal processing part 4 outputs the R, G and B signals supplied from the decoder processing part 5 and an image signal outputted from a character generating part 10 independently from each other, or combines the R, G and B signals with the image signal, according to necessity, and outputs the combined signals. The character generating part 10 forms, in accordance with an instruction from the control means 7, signals for a caution and a warning word for the user and for image plane adjusting data related to brightness, color, etc.

Incidentally, while, in the ninth embodiment, the decoder processing part 5 is disposed in the front stage of the signal processing part 4, the decoder processing part 5 may be disposed in the rear stage of the signal processing part 4. In this case, a video signal from the external apparatus is first inputted to the signal processing part 4, and is then combined with an image signal from the character generating part 10 according to necessity. After that, the combined signal is inputted to the decoder processing part 5 so as to be converted into R, G and B signals.

The audio processing part 8 processes the inputted audio signal in accordance with the audio parameters as inputted. The thus-processed audio signal is inputted to earphones 30 through the cable 43 and 46 (shown in FIG. 25). The earphones 30 are attached to the mounting unit 40 (shown in FIG. 25).

The power supply circuit 1 receives electric power from an external power supply 1*a* through a power supply switch 1*b*, and forms and supplies driving voltages for the respective blocks. Further, driving voltages for a display driving circuit 3 and drivers 13 and 29 which are contained in the mounting unit 40 (shown in FIG. 25) are supplied through the cables 43 and 46 (shown in FIG. 25).

The R, G and B signals (or the image signal, or the R, G and B signals combined with the image signal) outputted from the signal processing part 4 are inputted to the display driving circuit 3 through the cables 43 and 46 (shown in FIG. 25). The display driving circuit 3 supplies the inputted R, G and B signals to a left-eye display system 12 or a right-eye display system 28. The display driving circuit 3, the left-eye display system 12 and the right-eye display system 28 are contained in the mounting unit 40 (shown in FIG. 25).

The left-eye display system 12 has a liquid crystal display element 23 arranged to receive the R, G and B signals from the display driving circuit 3 and to display a video image represented by the R, G and B signals. The liquid crystal display element 23 is illuminated from the back side thereof by a back light 15, which is driven by a driver 13. A video image displayed on the liquid crystal display element 23 is enlarged by an optical element 25 and is then led to the left eye 27 of the user. More specifically, in the optical element 25, light having passed through the liquid crystal display element 23 from the back light 15 enters an entrance surface 17. The entering light is made incident on a reflecting surface 19 at an angle more than a critical angle to be totally reflected at the reflecting surface 19. Then, the light is made incident on a half-mirror 21 to be reflected toward the reflecting surface 19. The light reflected from the half-mirror 21 enters the reflecting surface 19 at an angle less than the critical angle and, then, exits toward the left eye 27 of the user. On the left eye 27, the light from the optical element 25 is focused to form an image.

The right-eye display system 28 has, similarly to the left-eye display system 12, a liquid crystal display element 33, an optical element 34, a back light 31 and a driver 29, and is arranged to enlarge, by the optical element 34, a video image displayed on the liquid crystal display element 33 and, then, lead the video image to the right eye. (not shown) of the user.

To the display driving circuit 3 and the drivers 13 and 29, as mentioned above, the driving voltages are respectively supplied from the power supply circuit 1.

Incidentally, while, in the ninth embodiment, the back lights 15 and 31 are respectively provided in the left-eye display system 12 and the right-eye display system 28, a single back light may be used for both the liquid crystal display elements 23 and 33.

Figure 26:
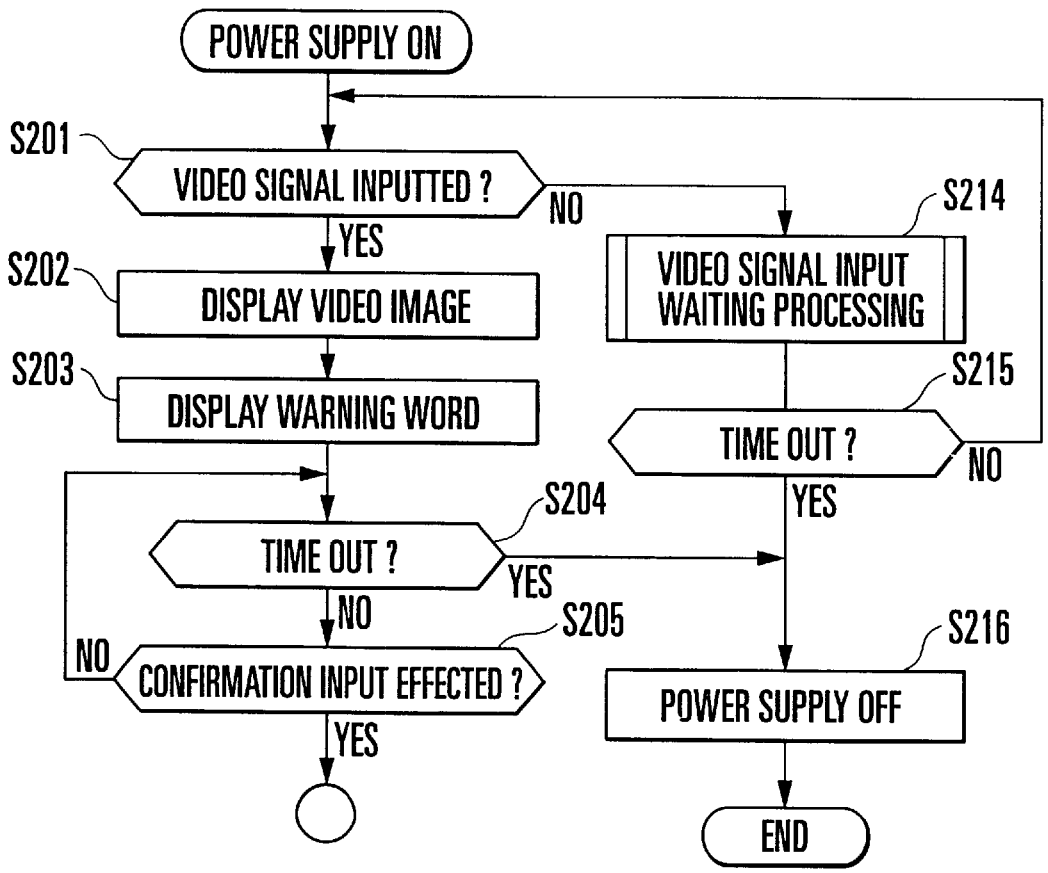
FIG. 26 is a flow chart showing the procedure for the video image display operation control in the head-mounted display apparatus shown in FIG. 24.
Figure 27:
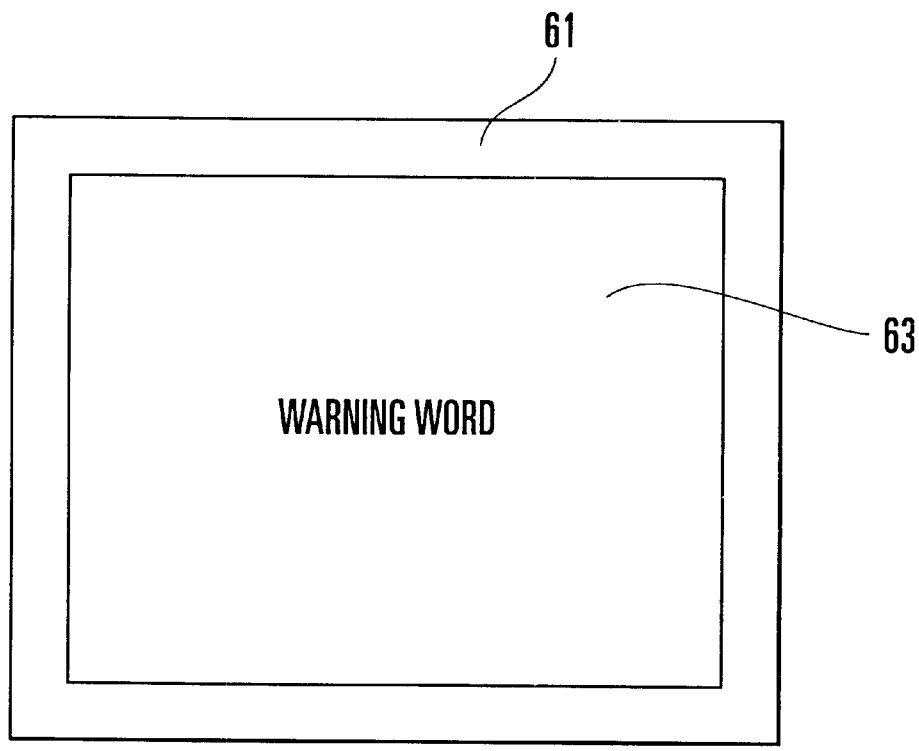
FIG. 27 is a diagram showing a display example of a warning word in step S203 of FIG. 26.
Figure 28:
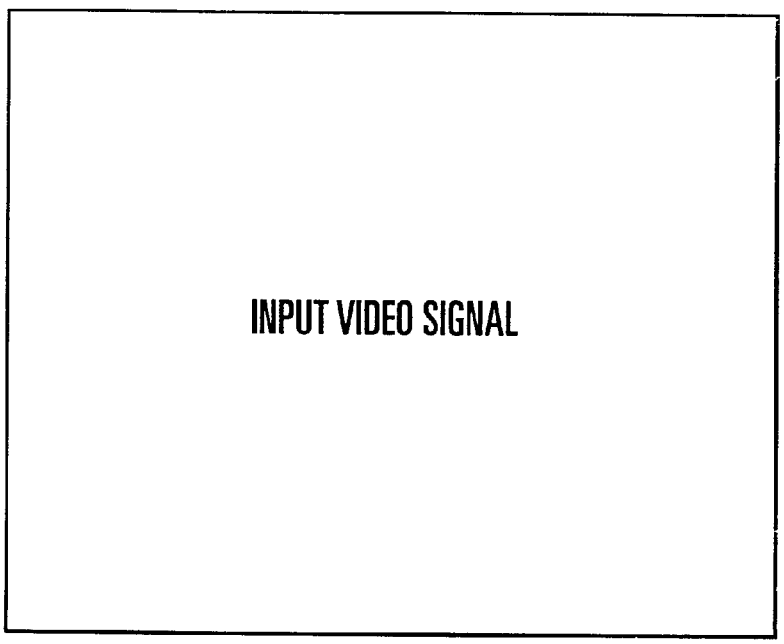
FIG. 28 is a diagram showing a display example of a message for advising the inputting of a video signal in step S214 of FIG. 26.

In the ninth embodiment, the control means 7 controls the video image display operation so as to perform a warning display processing for displaying warning information in accordance with the presence or absence of inputting of a video signal. The control over the video image display operation will be described with reference to FIGS. 26 to 28. FIG. 26 is a flow chart showing the procedure for the video image display operation control in the head-mounted display apparatus shown in FIG. 24. FIG. 27 is a diagram showing a display example of a warning word indicative of a precaution in usage in step S203 of FIG. 26. FIG. 28 is a diagram showing a display example of a message for advising the inputting of a video signal in step S214 of FIG. 26.

When the power supply circuit 1 is turned on, referring to FIG. 26, in step S201, a check is made for the presence or absence of inputting of a video signal supplied from an external apparatus. If the video signal is being inputted from the external apparatus, the flow proceeds to step S202. On the other hand, if no video signal is being inputted from the external apparatus, the flow proceeds to step S214, where a video signal input waiting processing is performed. In the video signal input waiting processing, the control means 7 instructs the character generating part 10 to generate a message for advising the user to input a video signal, and causes the message to be sent to and displayed on the left-eye display system 12 and the right-eye display system 28. That message is composed of character information indicating that "INPUT VIDEO SIGNAL", as shown in FIG. 28. In the subsequent step S215, the control means 7 monitors the inputting of a video signal until a predetermined period of time elapses from the time of starting displaying the message. Then, a check is made to find if the inputting of a video signal is detected before the predetermined period of time elapses. At the time before the predetermined period of time elapses, the flow returns to step S201. If the inputting of a video signal is detected before the time becomes out in step S215, the flow proceeds to step S202 through step S201. On the other hand, if the inputting of a video signal is not detected before the predetermined period of time elapses (the time becoming out), the flow proceeds to step S216, where the power supply circuit 1 is turned off, and the present processing is brought to an end.

In step S202, the control means 7 causes a video signal to be sent to the left-eye display system 12 and the right-eye display system 28 so as to display a video image. In the subsequent step S103, the control means 7 instructs the character generating part 10 to generate, as warning information, a warning word representing a precaution in usage, and causes the warning word to be displayed on the left-eye display system 12 and the right-eye display system 28 in the state of being superposed on the video image. Further, at the same time, the control means 7 sets, at a timer, a predetermined displaying period of time for displaying the warning word, and starts the timer. Here, on each image plane of the left-eye display system 12 and the right-eye display system 28, as shown in FIG. 27, the warning word is displayed within a warning-word displaying area 63 which is superposed on a video image displaying area 61. The warning word is composed of character information representing the restriction of the long-time usage, the measures against an unpleasant feeling, etc. The color of such character information is set to one of three original colors, i.e., red, green and blue. The color of the background of the character information is set to black. In addition, the color of the background of the character information may be set to a color obtained by combining the original color of the character information with one of the three original colors which is different from the original color of the character information.

Subsequently, the flow proceeds to step S204, where a check is made to find if the time counted by the above-mentioned timer has become out. If not, the flow proceeds to step S205, where a check is made to find if the confirmation input has been effected. The confirmation input is effected by operating the operation button 47 of the remote-controller 45 when the user has viewed and understood the warning word. If it is found that no confirmation input is effected, the flow returns to step S204. If the time counted by the timer becomes out without the confirmation input being effected, it is considered that the understanding by the user has not been obtained. Accordingly, the flow proceeds to step S216, where the power supply circuit 1 is turned off, so that the present processing is brought to an end. If the confirmation input is effected before the time counted by the timer becomes out, the control means 7 stops the character generating part 10 from generating the warning ward. Then, the flow proceeds to a video image display processing for displaying a video image represented by the inputted video signal.

As has described above, in the ninth embodiment, if no video signal is being inputted, a message for advising the user to input a video signal is displayed. Accordingly, the user is made by the message to know forgetting to input a video signal, so that it is possible to instantly perform the measures against forgetting to input a video signal. Thus, it is possible to improve the convenience for the user. Further, when a video signal is inputted, a warning word indicative of the restriction of the long-time usage, the measures against an unpleasant feeling, etc., is displayed. Accordingly, the user is notified by the warning word of a precaution in usage, it is possible to beforehand prevent the user from running into such usage circumstances as to impair pleasantness due to the continuous long-time usage.

Incidentally, while in the ninth embodiment the operation button 47 is provided on the remote-controller 45, an operation button similar to the operation button 47 may be additionally provided on the relay box 2.

(Tenth Embodiment)

Figure 29:
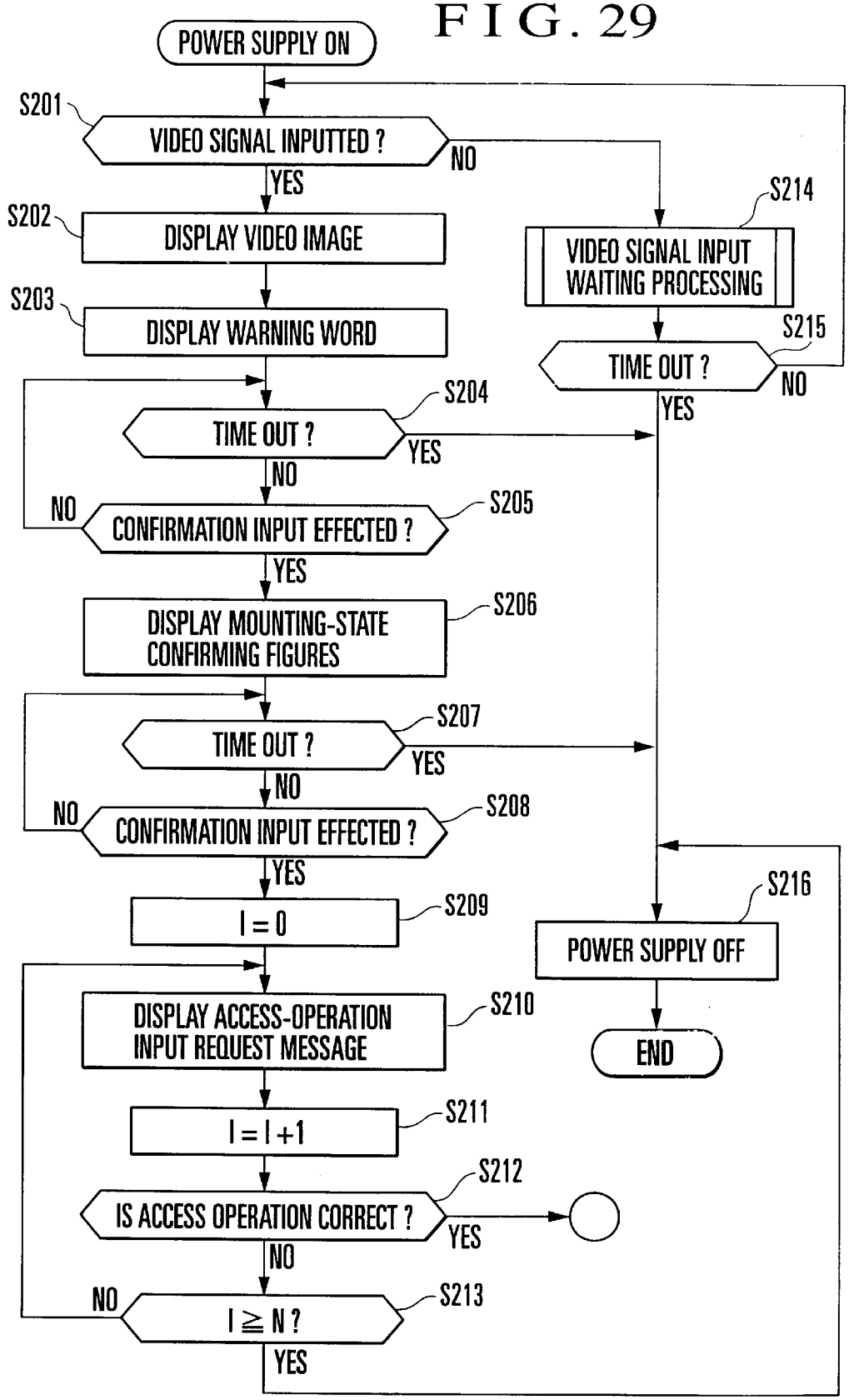
FIG. 29 is a flow chart showing the procedure for the video image display operation control in a head-mounted display apparatus according to a tenth embodiment of the invention.
Figure 30:
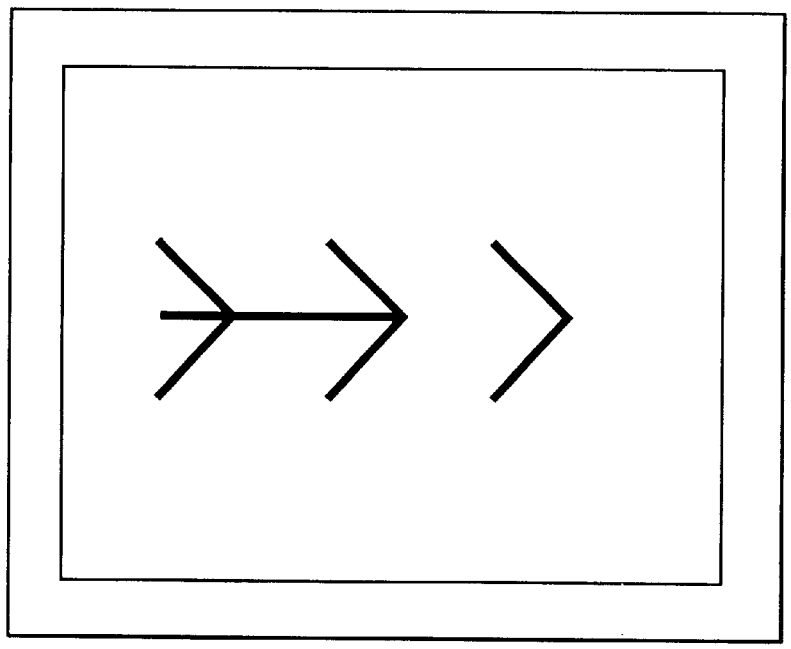
FIG. 30 is a diagram showing one example of a mounting-state confirming figure displayed on a left-eye display system in the head-mounted display apparatus according to the tenth embodiment of the invention.
Figure 31:
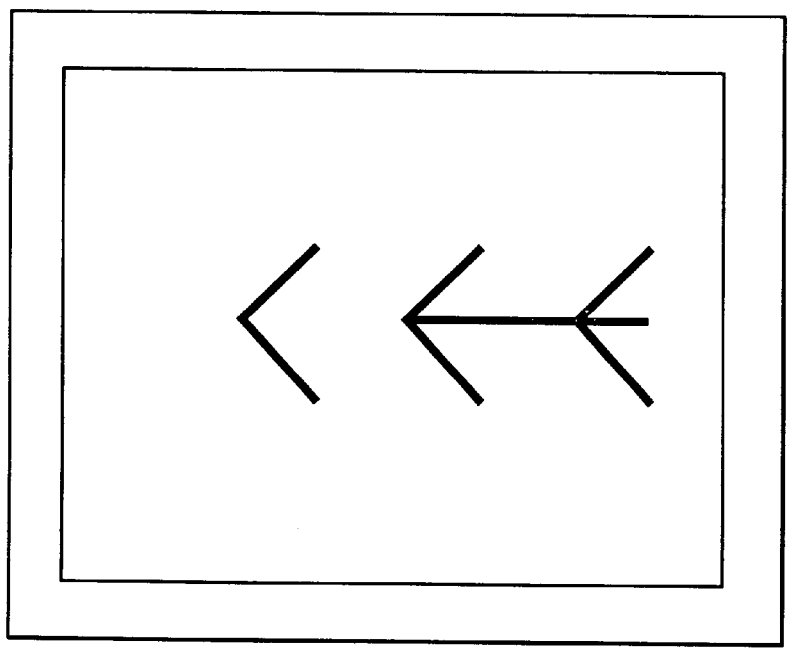
FIG. 31 is a diagram showing one example of a mounting-state confirming figure displayed on a right-eye display system in the head-mounted display apparatus according to the tenth embodiment of the invention.
Figure 32:
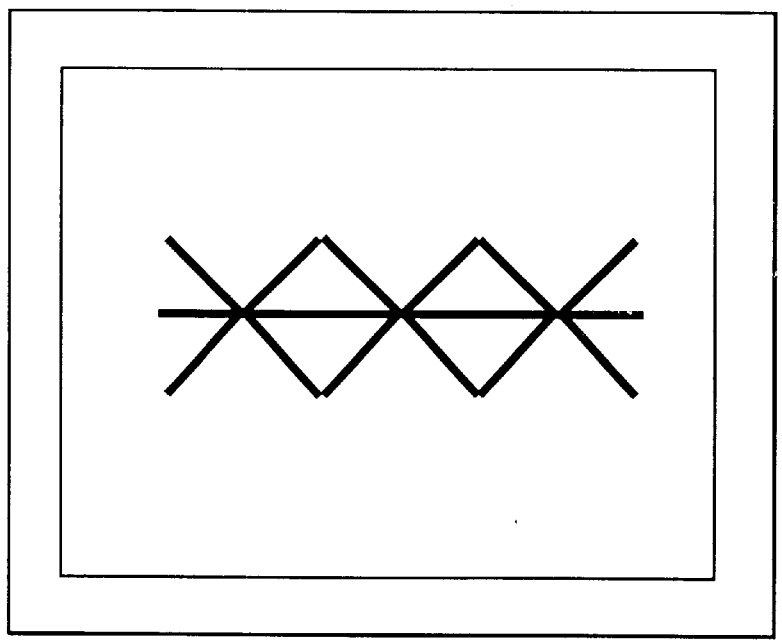
FIG. 32 is a diagram showing a figure obtained when the user observes, with the right and left eyes, the mounting-state confirming figures shown in FIGS. 30 and 31 with the head-mounted display apparatus correctly mounted on the head of the user.
Figure 33:
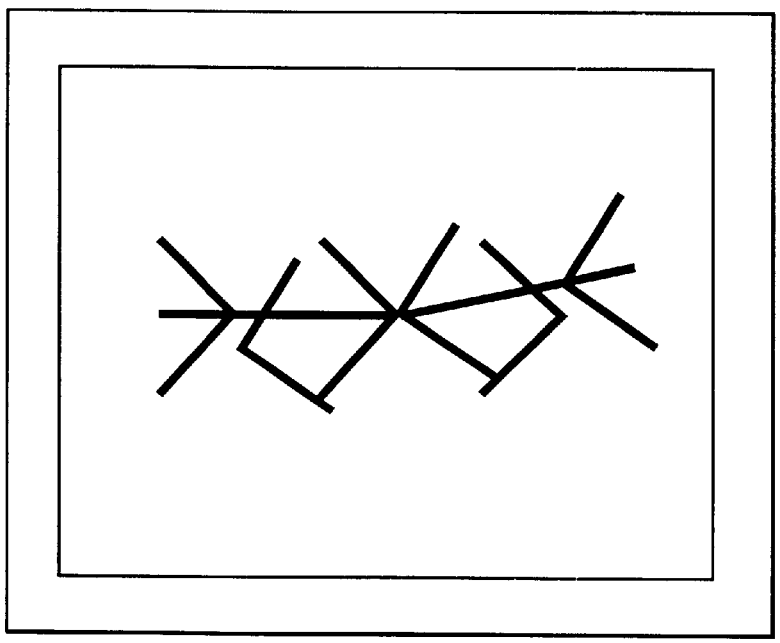
FIG. 33 is a diagram showing a figure obtained when the user observes, with the right and left eyes, the mounting-state confirming figures shown in FIGS. 30 and 31 with the head-mounted display apparatus incorrectly mounted on the head of the user.

Next, a tenth embodiment of the invention will be described with reference to FIGS. 29 to 33. FIG. 29 is a flow chart showing the procedure for the video image display operation control in a head-mounted display apparatus according to the tenth embodiment of the invention. FIG. 30 is a diagram showing one example of a mounting-state confirming figure displayed on a left-eye display system in the head-mounted display apparatus according to the tenth embodiment of the invention. FIG. 31 is a diagram showing one example of a mounting-state confirming figure displayed on a right-eye display system in the head-mounted display apparatus according to the tenth embodiment of the invention. FIG. 32 is a diagram showing a figure obtained when the user observes, with the right and left eyes, the mounting-state confirming figures shown in FIGS. 30 and 31 with the head-mounted display apparatus correctly mounted on the head of the user. FIG. 33 is a diagram showing a figure obtained when the user observes, with the right and left eyes, the mounting-state confirming figures shown in FIGS. 30 and 31 with the head-mounted display apparatus incorrectly mounted on the head of the user. The structural arrangement of the head-mounted display apparatus according to the tenth embodiment is the same as that of the ninth embodiment, and is, therefore, omitted from the following description.

The tenth embodiment differs from the ninth embodiment in that a mounting-state confirming processing for causing the character generating part 10 to generate mounting-state confirming figures, displaying the mounting-state confirming figures and confirming the mounting state of the mounting unit 40 and an access-operation input processing for inputting an access-operation input such as a password are additionally provided.

The video image display operation control including the mounting-state confirming processing and the access-operation input processing will be described with reference to FIG. 29. In FIG. 29, processing operations which are the same as those in the ninth embodiment are denoted by the same reference numerals as in FIG. 26, and the description of them is omitted here.

When the power supply circuit 1 is turned on, referring to FIG. 29, the processing operations of step S201 to step S205 or the processing operations of step S214, step S215 and step S216 are effected.

If, in step S205, the confirmation input, which indicates that the user has viewed and understood the warning word, is effected by operating the operation button 47 of the remote-controller 45, the flow proceeds to step S206. In step S206, the control means 7 instructs the character generating part 10 to generate mounting-state confirming figures, and causes the mounting-state confirming figures to be sent to and displayed on the left-eye display system 12 and the right-eye display system 28. Further, at the same time, the control means 7 sets, at a timer, a predetermined displaying period of time for displaying the mounting-state confirming figures, and starts the timer. Accordingly, the user is made to confirm the mounting state of the mounting unit 40 while viewing the mounting-state confirming figures with both the right and left eyes. Here, the mounting-state confirming figures are generated by the character generating part 10 respectively for the left-eye display system 12 and the right-eye display system 28. For example, a figure shown in FIG. 30 is generated and displayed as the mounting-state confirming figure for the left-eye display system 12, and a figure shown in FIG. 31 is generated and displayed as the mounting-state confirming figure for the right-eye display system 28. For example, with the mounting unit 40 correctly mounted on the head of the user, when the user observes the mounting-state confirming figures shown in FIGS. 30 and 31 with both the right and left eyes, the mounting-state confirming figures displayed on the left-eye display system 12 and the right-eye display system 28 are merged into such a figure as shown in FIG. 32 to be observed. On the other hand, with the mounting unit 40 incorrectly mounted on the head of the user, when the user observes the mounting-state confirming figures shown in FIGS. 30 and 31 with both the right and left eyes, the mounting-state confirming figures displayed on the left-eye display system 12 and the right-eye display system 28 are merged into such a figure as shown in FIG. 33 to be observed. The figure shown in FIG. 33 is out of shape as compared with the figure shown in FIG. 32.

Subsequently, the flow proceeds to step S207, where a check is made to find if the time counted by the above-mentioned timer has become out. If not, the flow proceeds to step S208, where a check is made to find if the confirmation input has been effected. The confirmation input is effected by operating the operation button 47 when, while viewing the mounting-state confirming figures with both the right and left eyes, the user has considered that the mounting state of the mounting unit 40 is correct. The determination that the mounting state of the mounting unit 40 is correct is made when the figure shown in FIG. 32 has been observed by the user. If it is found that no confirmation input is effected, the flow returns to step S207. If the time counted by the timer becomes out without the confirmation input being effected, it is considered that the confirmation of the mounting state of the mounting unit 40 by the user has not been obtained, i.e., the determination of the mounting state of the mounting unit 40 to be incorrect has been made with the figure shown in FIG. 33 observed by the user. Accordingly, the flow proceeds to step S216, where the power supply circuit 1 is turned off, so that the present processing is brought to an end. If the confirmation input is effected before the time counted by the timer becomes out, the control means 7 stops the character generating part 10 from generating the mounting-state confirming figures. Then, the flow proceeds to step S209.

In step S209, a variable I for indicating the number of times of inputting of an access operation, such as a password, is initialized to "0". In the subsequent step S210, the control means 7 instructs the character generating part 10 to generate an access-operation input request message, and causes the access-operation input request message to be sent to and displayed on the left-eye display system 12 and the right-eye display system 28 together with a video image. Further, at the same time, the control means 7 sets, at a timer, a predetermined displaying period of time for displaying the access-operation input request message, and starts the timer. Here, on each image plane of the left-eye display system 12. and the right-eye display system 28, the access-operation input request message and the video image are displayed in the state of being superposed on each other. Upon viewing the access-operation input request message, the user is made to input the access operation by operating the operation button 47 of the remote-controller 45.

Subsequently, the flow proceeds to step S211, where the variable I is incremented by one. In the subsequent step S212, a check is made to find if the inputted access operation is correct. If not, the flow proceeds to step S213, a check is made to find if the variable I is not less than a predetermined number of times N. If the variable I is less than the predetermined number of times N, the flow returns to step S210, repeating the incrementing of the variable I and the determination of correctness of the inputted access operation. If the correct access operation is not inputted before the variable I becomes equal to or larger than the predetermined number of times N, the flow proceeds to step S216, where the power supply circuit 1 is turned off, so that the present processing is brought to an end. On the other hand, if the correct access operation is inputted before the variable I becomes equal to or larger than the predetermined number of times N, the control means 7 stops the character generating part 10 from generating the access-operation input request message. Then, the flow proceeds to the video image display processing for displaying a video image represented by the inputted video signal.

As described above, in the tenth embodiment, since the processing for causing the character generating part 10 to generate mounting-state confirming figures so as to confirm the mounting state of the mounting unit 40 and the access-operation input processing for inputting an access-operation input such as a password are effected, it is possible to determine the correct mounting state of the mounting unit 40 with ease, and it is possible to restrain another user who does not know a correct access-operation input from using the head-mounted display apparatus. Further, it is possible to obtain the same advantageous effect as that in the ninth embodiment.

(Eleventh Embodiment)

Figure 34:
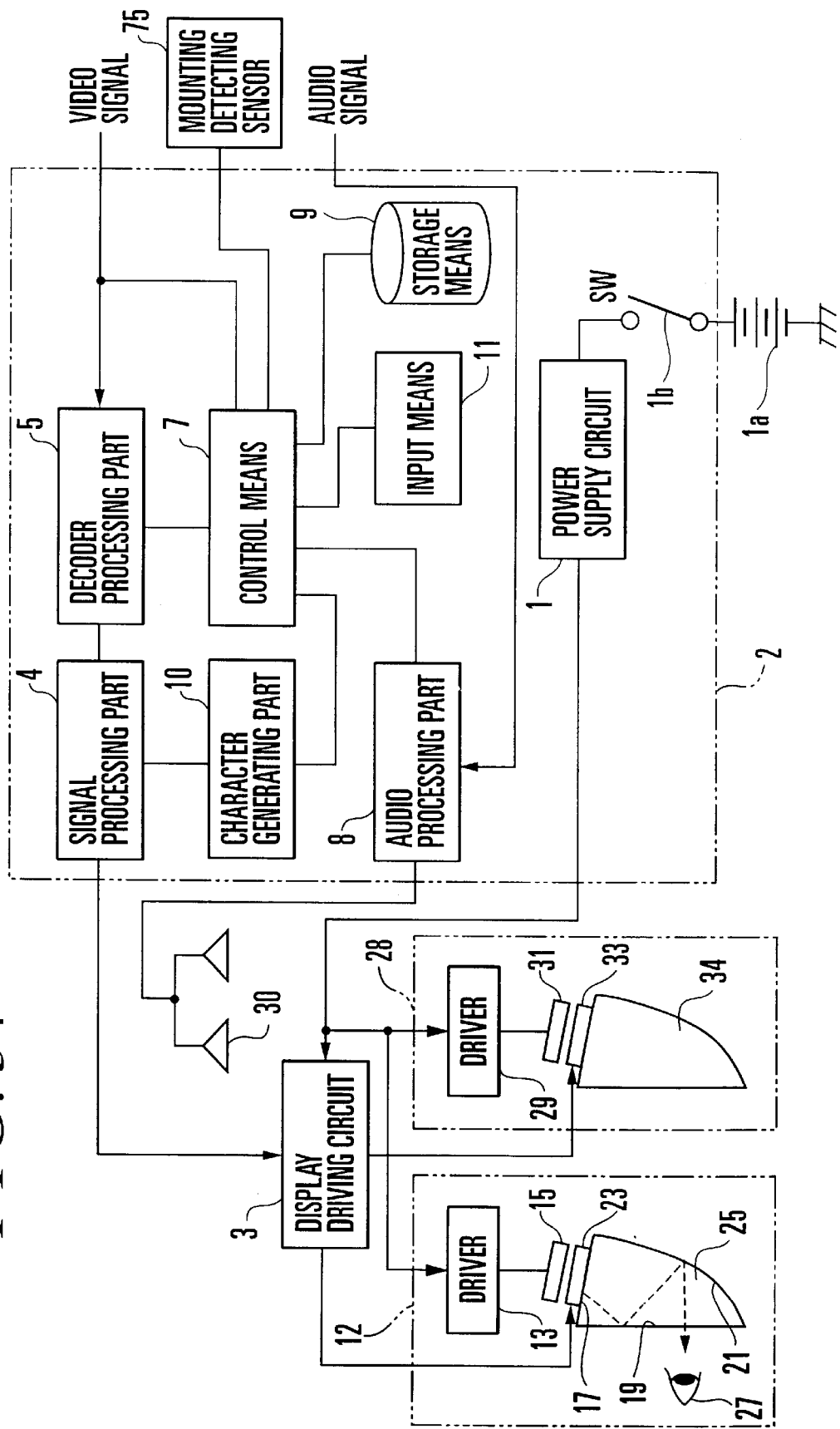
FIG. 34 is a block diagram showing the arrangement of a head-mounted display apparatus according to an eleventh embodiment of the invention.
Figure 35:
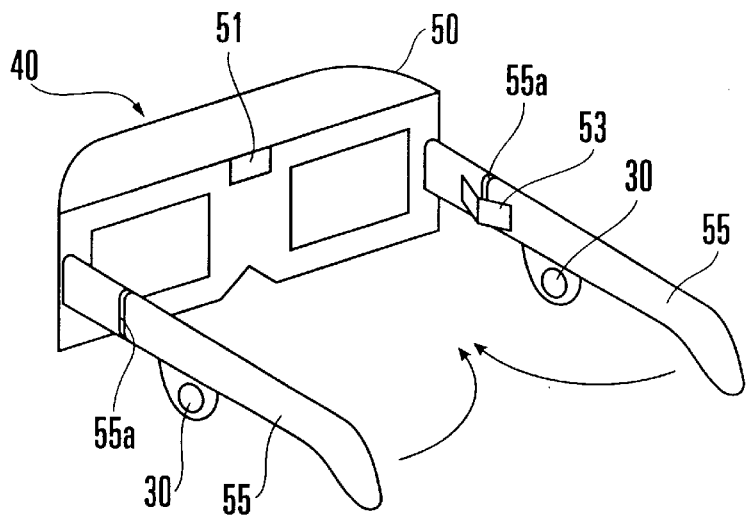
FIG. 35 is a perspective view showing the appearance of the head-mounted display apparatus shown in FIG. 34.
Figure 36:
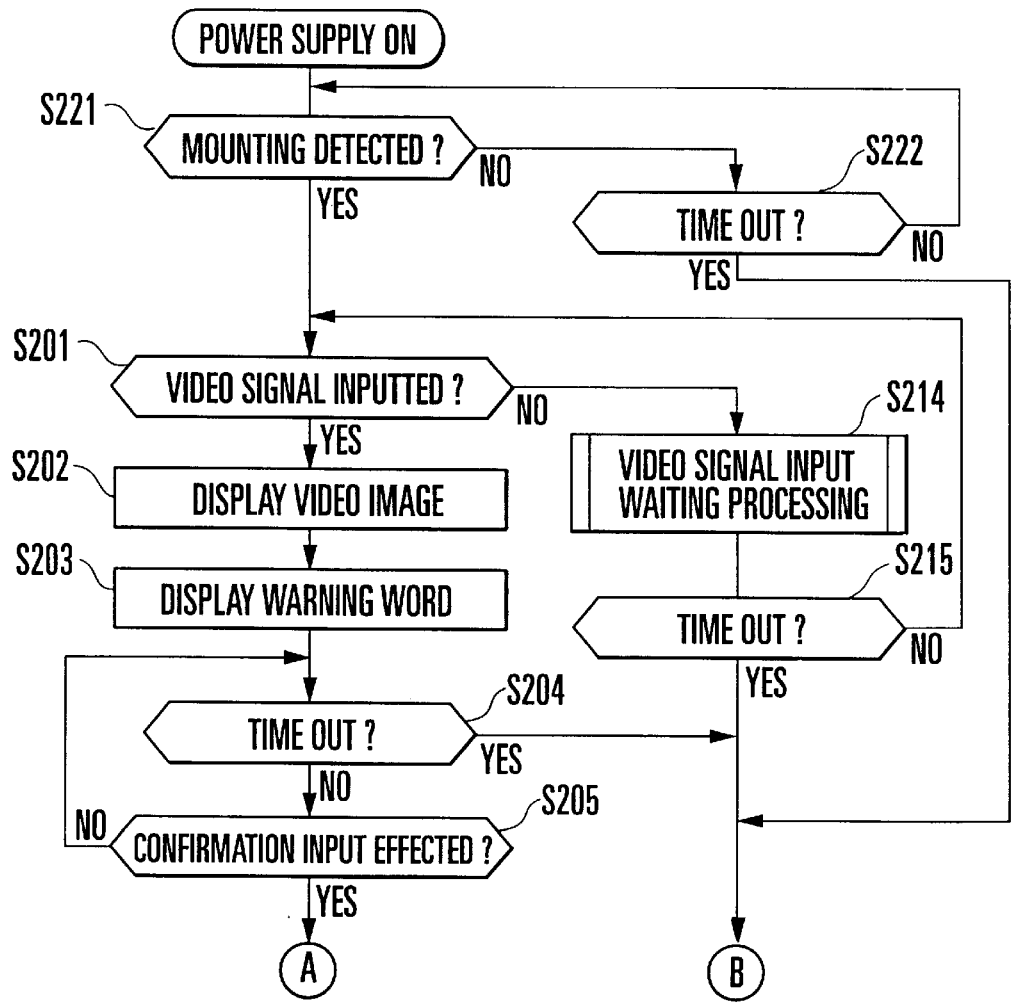
FIG. 36 is a flow chart showing the procedure for the video image display operation control in the head-mounted display apparatus shown in FIG. 34.
Figure 37:
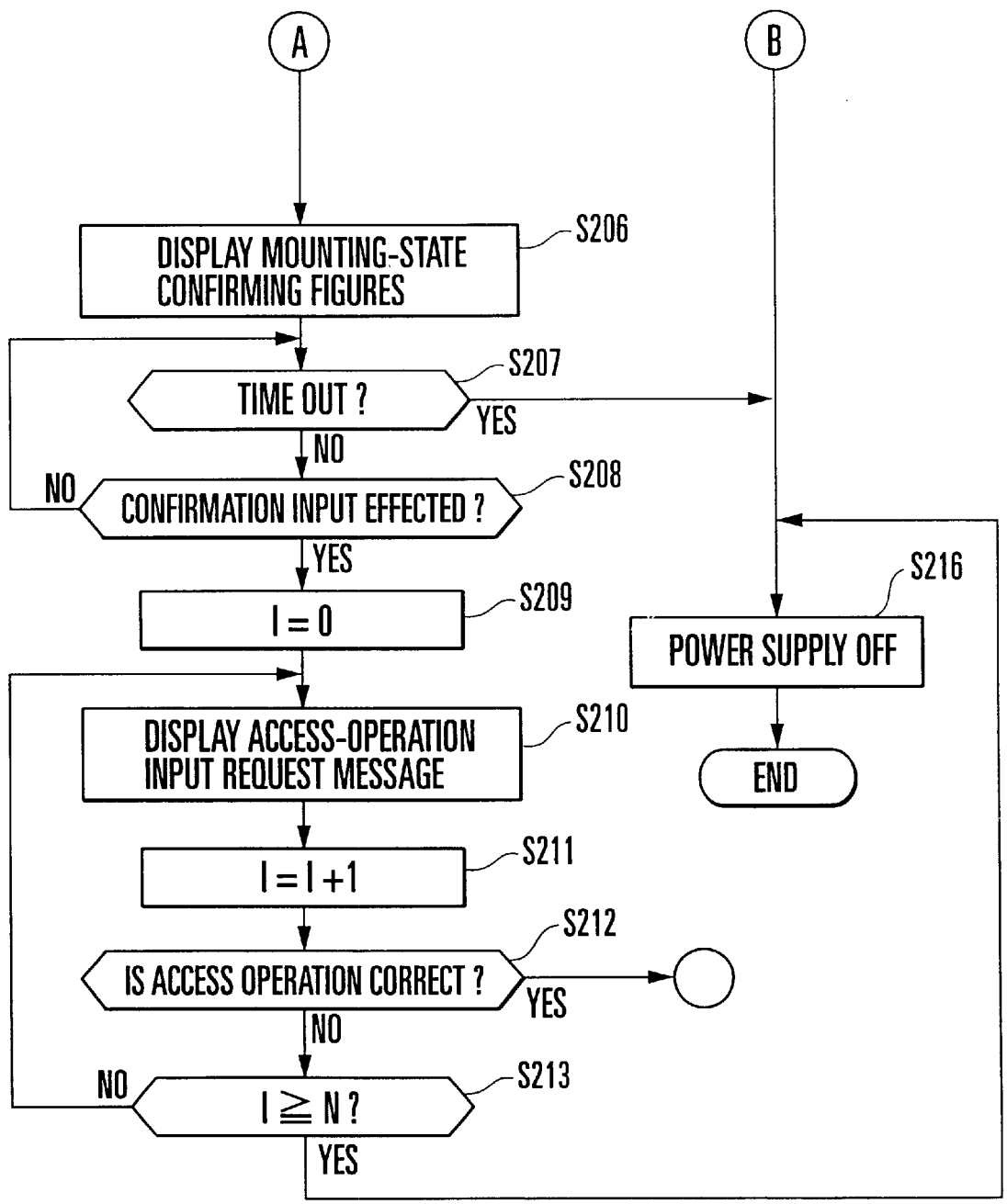
FIG. 37 is a flow chart showing the procedure for the video image display operation control in the head-mounted display apparatus shown in FIG. 34.

Next, an eleventh embodiment of the invention will be described with reference to FIGS. 34 to 37. FIG. 34 is a block diagram showing the arrangement of a head-mounted display apparatus according to the eleventh embodiment of the invention. FIG. 35 is a perspective view showing the appearance of the head-mounted display apparatus shown in FIG. 34. FIGS. 36 and 37 are flow charts showing the procedure for the video image display operation control in the head-mounted display apparatus shown in FIG. 34.

First, the structural arrangement of the head-mounted display apparatus according to the eleventh embodiment will be described with reference to FIGS. 34 and 35. In FIGS. 34 and 35, the blocks similar to those in the ninth embodiment are denoted by the same reference numerals as in FIG. 24, and are omitted from the following description.

More specifically, as shown in FIG. 34, the head-mounted display apparatus according to the eleventh embodiment differs from that according to the ninth embodiment in that a mounting detecting sensor 75 for detecting that the mounting unit 40 (shown in FIG. 35) has been mounted on a predetermined part of the body of the user is provided on the mounting unit 40, and the control means 7 controls the displaying of warning information on the basis of a detection signal of the mounting detecting sensor 75 and the presence or absence of inputting of a video signal.

The mounting unit 40 is composed of a spectacles-type frame body to be worn by the user, as shown in FIG. 35. The frame body includes a frame part 50 which holds the display driving circuit 3 and the left-eye and right-eye display systems 12 and 28, and a pair of temple parts 55.

On the back side of the frame part 50, there is provided a touch sensor 51. The touch sensor 51 outputs a detection signal indicating the mounting of the mounting unit 40 when coming into contact with the brow of the user with the mounting unit 40 mounted on the head of the user. Incidentally, in place of the touch sensor 51, a pressure sensor for sensing pressure received by the contact with the brow of the user when the mounting unit 40 is mounted on the head of the user may be used.

The pair of temple parts 55 are respectively supported by the frame part 50 at pivot shafts 55a in such a way as to be turnable by a predetermined angle. A holding mechanism part 53, which contains therein a spring sensor, is provided at the pivot shaft 55a where each temple part 55 is supported. The holding mechanism part 53 is capable of holding the associated temple part 55 in the state of being unfolded by the predetermined angle against the spring force of a spring member (not shown), and is also capable of folding the associated temple part 55 in the direction of an arrow shown in FIG. 35. The spring sensor contained in the holding mechanism part 53 outputs a detection signal indicating that the mounting unit 40 has been mounted on the head of the user, when the temple part 55 is unfolded by the predetermined angle. The spring sensor contained in the holding mechanism part 53 and the above-mentioned touch sensor 51 constitute the mounting detecting sensor 75 shown in FIG. 34. Detection signals outputted from these sensors are inputted to the control means 7. Here, the control means 7 is arranged to determine that the mounting unit 40 has been mounted, when both the detection signal from the spring sensor contained in the holding mechanism part 53 and the detection signal from the touch sensor 51 are outputted. Further, an earphone 30 to be mounted on the ear of the user is attached to each of the temple parts 55.

Next, the procedure for the video image display operation control in the eleventh embodiment will be described with reference to FIGS. 36 and 37. In FIGS. 36 and 37, the processing operations similar to those in the tenth embodiment shown in FIG. 29 are denoted by the same reference numerals as in FIG. 29, and are, therefore, omitted from the description.

In the eleventh embodiment, referring to FIG. 36, when the power supply circuit 1 is turned on, a check is made, in steps S221 and S222, to find if the mounting unit 40 has been mounted before a predetermined period of time elapses from the time of turning-on of the power supply circuit 1, on the basis of a detection signal from the mounting detecting sensor 75. Here, if the detection signals from the spring sensor contained in the holding mechanism part 53 and the touch sensor 51 are not outputted within the predetermined period of time, it is determined that the mounting unit 40 is not mounted. In addition, if only the detection signal from one of the spring sensor contained in the holding mechanism part 53 and the touch sensor 51 is outputted within the predetermined period of time, it is also determined that the mounting unit 40 is not mounted. On the other hand, if both the detection signals from the spring sensor contained in the holding mechanism part 53 and the touch sensor 51 are outputted within the predetermined period of time, it is determined that the mounting unit 40 has been mounted.

If the mounting of the mounting unit 40 is not detected within the predetermined period of time, the flow proceeds to step S216 shown in FIG. 37, where the power supply circuit 1 is turned off, and the present processing is brought to an end. On the other hand, if the mounting of the mounting unit 40 is detected within the predetermined period of time, the flow proceeds to step S201. In step S201, a check is made for the presence or absence of inputting of a video signal. If the inputting of a video signal is detected, the flow proceeds to step S203, where a warning word is displayed. A series of processing operations performed from step S201 to step S213 (shown in FIGS. 36 and 37) is the same as that in the tenth embodiment shown in FIG. 29, and is, therefore, omitted from the description.

As described above, the display of a message for advising the user to input a video signal and the display of a warning word indicative of a precaution in usage are controlled on the basis of a result of determination as to whether the mounting of the mounting unit 40 has been detected, with the detection signal from the mounting detecting sensor 75, before a predetermined period of time elapses from the time of turning-on of the power supply circuit 1 and on the basis of a result of determination as to the presence or absence of inputting of a video signal. Accordingly, it is possible to beforehand prevent the display of the message or the warning word from starting in the middle of mounting of the mounting unit 40. Therefore, it is possible to surely present the message or the warning word to the user. Further, it is possible to obtain the same advantageous effect as in the tenth embodiment.

As has been described in the foregoing, in accordance with each of the ninth to eleventh embodiments, a head-mounted display apparatus comprises warning information generating means for generating warning information for the user, video signal detecting means for detecting presence or absence of inputting of the video signal, and control means for controlling the video image to be displayed on the video image display means, wherein the control means controls the video image display means to display the warning information on the basis of a result of detection of the presence or absence of inputting of the video signal. Accordingly, it is possible to beforehand prevent the user from running into such usage circumstances as to impair pleasantness due to the continuous long-time usage, and it is possible to improve the convenience for the user.

Further, a head-mounted display apparatus comprises mounting-state detecting means for detecting a mounting state of a body of the apparatus on a user, warning information generating means for generating warning information for the user, video signal detecting means for detecting presence or absence of inputting of the video signal, and control means for controlling the video image to be displayed on the video image display means, wherein the control means controls the video image display means to display the warning information on the basis of a result of detection of the mounting state and a result of detection of the presence or absence of inputting of the video signal. Accordingly, it is possible to beforehand prevent the user from running into such usage circumstances as to impair pleasantness due to the continuous long-time usage, and it is possible to improve the convenience for the user.

What is claimed is:

1. A head-mounted display apparatus, comprising:

left-eye image display means;

right-eye image display means;

a mounting unit arranged to support said left-eye image display means and said right-eye image display means and to be mountable on a part of the body of a user;

figure generating means for generating a mounting-state confirming figure for confirming a mounting state of said mounting unit when said mounting unit has been mounted on the part of the body of the user;

operation inputting means for inputting a confirmation operation when the user has confirmed the mounting state of said mounting unit;

control means for selecting, in accordance with the inputting of the confirmation operation, one of a state of displaying the mounting-state confirming figure both on said left-eye image display means and said right-eye image display means, a state of displaying the mounting-state confirming figure on one of said left-eye image display means and said right-eye image display means, and a state of displaying the mounting-state confirming figure on another of said left-eye image display means and said right-eye image display means.

2. A head-mounted display apparatus according to claim 1, wherein said control means selects, when the confirmation operation is inputted after the state of displaying the mounting-state confirming figure both on said left-eye image display means and said right-eye image display means, the state of displaying the mounting-state confirming figure on one of said left-eye image display means and said right-eye image display means, and selects, when the confirmation operation is inputted after the state of displaying the mounting-state confirming figure on one of said left-eye image display means and said right-eye image display means, the state of displaying the mounting-state confirming figure on another of said left-eye image display means and said right-eye image display means.

3. A head-mounted display apparatus according to claim 1, wherein said control means selects, when the confirmation operation is inputted after the state of displaying the mounting-state confirming figure on one of said left-eye image display means and said right-eye image display means, the state of displaying the mounting-state confirming figure on another of said left-eye image display means and said right-eye image display means, and selects, when the confirmation operation is inputted after the state of displaying the mounting-state confirming figure on another of said left-eye image display means and said right-eye image display means, the state of displaying the mounting-state confirming figure both on said left-eye image display means and said right-eye image display means.

4. A head-mounted display apparatus according to claim 1, wherein said operation inputting means allows, as well as inputting the confirmation operation, inputting a redoing operation for redoing confirmation of the mounting state by the user, and said control means repeats, when the redoing operation is inputted after the state of displaying the mounting-state confirming figure both on said left-eye image display means and said right-eye image display means, the state of displaying the mounting-state confirming figure on one of said left-eye image display means and said right-eye image display means and the state of displaying the mounting-state confirming figure on another of said left-eye image display means and said right-eye image display means are selected in a predetermined order in accordance with the inputting of the confirmation operation, the state of displaying the mounting-state confirming figure both on said left-eye image display means and said right-eye image display means, the state of displaying the mounting-state confirming figure on one of said left-eye image display means and said right-eye image display means and the state of displaying the mounting-state confirming figure on another of said left-eye image display means and said right-eye image display means.

5. A head-mounted display apparatus according to claim 1, wherein said operation inputting means allows, as well as inputting the confirmation operation, inputting a redoing operation for redoing confirmation of the mounting state by the user, and said control means resumes, when the redoing operation is inputted after one of the state of displaying the mounting-state confirming figure both on said left-eye image display means and said right-eye image display means, the state of displaying the mounting-state confirming figure on one of said left-eye image display means and said right-eye image display means and the state of displaying the mounting-state confirming figure on another of said left-eye image display means and said right-eye image display means is selected, a state of displaying the mounting-state confirming figure obtained before the inputting of the redoing operation.

6. A head-mounted display apparatus according to claim 1, wherein said control means changes over, every after lapse of a predetermined period of time, the state of displaying the mounting-state confirming figure both on said left-eye image display means and said right-eye image display means, the state of displaying the mounting-state confirming figure on one of said left-eye image display means and said right-eye image display means and the state of displaying the mounting-state confirming figure on another of said left-eye image display means and said right-eye image display means.

7. A head-mounted display apparatus according to claim 6, wherein a power supply of said apparatus is automatically shut off when the confirmation operation is not inputted within the predetermined period of time in each of the state of displaying the mounting-state confirming figure both on said left-eye image display means and said right-eye image display means, the state of displaying the mounting-state confirming figure on one of said left-eye image display means and said right-eye image display means and the state of displaying the mounting-state confirming figure on another of said left-eye image display means and said right-eye image display means.

8. A head-mounted display apparatus according to claim 1, wherein the mounting-state confirming figure is a rectangular frame to be displayed on an entire image plane.

9. A head-mounted display apparatus according to claim 1, wherein the mounting-state confirming figure is a character to be displayed on each of four corners of an image plane.

10. A head-mounted display apparatus according to claim 1, wherein, when the mounting-state confirming figure is displayed on one of said left-eye image display means and said right-eye image display means, the mounting-state confirming figure is not displayed on another of said left-eye image display means and said right-eye image display means.

11. A head-mounted display apparatus according to claim 1, wherein an explanatory word is added to the mounting-state confirming figure, and, when the mounting-state confirming figure is displayed on one of said left-eye image display means and said right-eye image display means, both the mounting-state confirming figure and the explanatory word are displayed on one of said left-eye image display means and said right-eye image display means and only the explanatory word is displayed on another of said left-eye image display means and said right-eye image display means.

12. A mounting-state confirming method for a head-mounted display apparatus having left-eye image display means, right-eye image display means, and a mounting unit arranged to support said left-eye image display means and said right-eye image display means and to be mountable on a part of the body of a user, said mounting-state confirming method comprising:

a step of holding a display order of displaying a mounting-state confirming figure for confirming a mounting state of said mounting unit when said mounting unit has been mounted on the part of the body of the user among a first display state of displaying the mounting-state confirming figure both on said left-eye image display means and said right-eye image display means, a second display state of displaying the mounting-state confirming figure on one of said left-eye image display means and said right-eye image display means, and a third display state of displaying the mounting-state confirming figure on another of said left-eye image display means and said right-eye image display means;

a step of generating the mounting-state confirming figure;

a step of displaying the mounting-state confirming figure according to a display state corresponding to the first of said held display order;

a step of displaying, when a confirmation operation for confirming the mounting state of said mounting unit by the user is inputted after displaying the mounting-state confirming figure according to the display state corresponding to the first of said held display order, the mounting-state confirming figure according to a display state corresponding to the second of said held display order; and a step of displaying, when the confirmation operation is inputted after displaying the mounting-state confirming figure according to the display state corresponding to the second of said held display order, the mounting-state confirming figure according to a display state corresponding to the third of said held display order.

13. A mounting-state confirming method for a head-mounted display apparatus, according to claim 12, wherein said display order of displaying the mounting-state confirming figure is set to such an order as the first display state, the second display state and the third display state.

14. A mounting-state confirming method for a head-mounted display apparatus, according to claim 12, wherein said display order of displaying the mounting-state confirming figure is set to such an order as the second display state, the third display state and the first display state.

15. A mounting-state confirming method for a head-mounted display apparatus, according to claim 12, further comprising:

a step of inputting a redoing operation for redoing confirmation of the mounting state of said mounting unit by the user after displaying the mounting-state confirming figure according to the respective display states set in accordance with said display order; and a step of, when the redoing operation is inputted, repeating displaying the mounting-state confirming figure according to the respective display states set in accordance with said display order.

16. A mounting-state confirming method for a head-mounted display apparatus, according to claim 12, further comprising:

a step of inputting a redoing operation for redoing confirmation of the mounting state of said mounting unit by the user every after displaying the mounting-state confirming figure according to one of the respective display states set in accordance with said display order; and a step of, when the redoing operation is inputted, repeating displaying the mounting-state confirming figure according to the display state obtained before the redoing operation is inputted.

17. A mounting-state confirming method for a head-mounted display apparatus, according to claim 12, wherein the mounting-state confirming figure according to one of the respective display states set in accordance with said display order is changed over to the mounting-state confirming figure according to another of the respective display states every after lapse of a predetermined period of time.

18. A mounting-state confirming method for a head-mounted display apparatus, according to claim 17, wherein a power supply of said apparatus is automatically shut off when the confirmation operation is not inputted within the predetermined period of time in each of the respective display states.

19. A mounting-state confirming method for a head-mounted display apparatus, according to claim 12, wherein the mounting-state confirming figure is a rectangular frame to be displayed on an entire image plane.

20. A mounting-state confirming method for a head-mounted display apparatus, according to claim 12, wherein the mounting-state confirming figure is a character to be displayed on each of four corners of an image plane.

21. A mounting-state confirming method for a head-mounted display apparatus, according to claim 12, wherein, when the mounting-state confirming figure is displayed on one of said left-eye image display means and said right-eye image display means, the mounting-state confirming figure is not displayed on another of said left-eye image display means and said right-eye image display means.

22. A mounting-state confirming method for a head-mounted display apparatus, according to claim 12, wherein an explanatory word is added to the mounting-state confirming figure, and, when the mounting-state confirming figure is displayed on one of said left-eye image display means and said right-eye image display means, both the mounting-state confirming figure and the explanatory word are displayed on one of said left-eye image display means and said right-eye image display means and only the explanatory word is displayed on another of said left-eye image display means and said right-eye image display means.

23. A head-mounted display apparatus, comprising:

left-eye image display means;

right-eye image display means; and control means for changing over, sequentially in a time-series manner, a display state of displaying mounting-state confirming figure information on said left-eye image display means, a display state of displaying the mounting-state confirming figure information on said right-eye image display means, and a display state of simultaneously displaying the mounting-state confirming figure information both on said left-eye image display means and said right-eye image display means.

24. A head-mounted display apparatus according to claim 23, further comprising confirming operation means for performing an operation for a user to confirm a mounting state of said apparatus with respect to each of said respective display states, and said control means changes, in accordance with the operation of said confirming operation means, one of said respective displays states to another thereof.

25. A head-mounted display apparatus according to claim 23, wherein said control means changes over said respective display state at intervals of a predetermined period of time.

* * * * *

UNITED STATES PATENT AND TRADEMARK OFFICE
CERTIFICATE OF CORRECTION

PATENT NO.    : 6,445,363 B1
DATED         : September 3, 2002
INVENTOR(S)   : Shinya Urisaka It is certified that error appears in the above-identified patent and that said Letters Patent is hereby corrected as shown below:

Column 11,
Line 53, delete "unit." and insert -- unit --.

Column 18,
Line 14, delete "S1O1a," and insert in boldface -- S101a, --.

Column 28,
Line 40, delete "eye." and insert -- eye --.

Signed and Sealed this

Fourteenth Day of October, 2003

JAMES E. ROGAN
*Director of the United States Patent and Trademark Office*